United States Patent [19]

Unosawa et al.

[11] Patent Number: 5,588,757
[45] Date of Patent: Dec. 31, 1996

[54] RECORDING APPARATUS WITH DETACHABLE MAGNETIC SENSOR

[75] Inventors: Yasuhiro Unosawa, Tokyo; Shinji Kanemitsu; Makoto Kashimura, both of Yokohama; Makoto Takemura, Tokyo; Shoji Kikuchi, Yokohama; Shinya Matsui, Tokyo; Toshiyuki Onishi, Yokohama; Tetsuhiro Nitta, Yokohama; Masaru Sato, Yokohama; Hisashi Morioka, Kawagoe, all of Japan

[73] Assignee: Canon Kabushiki Kaisha, Tokyo, Japan

[21] Appl. No.: 618,784

[22] Filed: Mar. 20, 1996

Related U.S. Application Data

[63] Continuation of Ser. No. 141,520, Oct. 27, 1993, abandoned.

[30] Foreign Application Priority Data

| Oct. 28, 1992 | [JP] | Japan | 4-313011 |
| Nov. 10, 1992 | [JP] | Japan | 4-324863 |
| Aug. 19, 1993 | [JP] | Japan | 5-226567 |

[51] Int. Cl.⁶ .................................................. B41J 19/00
[52] U.S. Cl. .............................. 400/279; 400/59; 400/322; 400/352; 400/692; 400/705.1
[58] Field of Search ................................ 400/59, 279, 320, 400/322, 328, 352, 692, 705, 705.1

[56] References Cited

U.S. PATENT DOCUMENTS 4,601,241  7/1986  Fujiwara ........................ 101/93.04
5,297,881  3/1994  Ishiyama ........................ 400/705.1

FOREIGN PATENT DOCUMENTS

| 0294154 | 12/1988 | European Pat. Off. | 400/279 |
| 0407578 | 1/1991 | European Pat. Off. | 400/279 |
| 62-226007 | 10/1987 | Japan | 400/279 |
| 57273 | 3/1988 | Japan | 400/59 |
| WO9104459 | 4/1991 | WIPO | 400/279 |

Primary Examiner—Edgar R. Burr
Assistant Examiner—Steven S. Kelley
Attorney, Agent, or Firm—Fitzpatrick, Cella, Harper & Scinto

[57] ABSTRACT

A recording apparatus for performing recording uses a carriage mounted with a recording head moving along a guide shaft. The recording apparatus includes a magnetic linear encoder consisting of a scale element magnetized and a detection unit for detecting magnetized information magnetized to the scale element. Provided also are clicks formed on any one of the detection unit and the carriage and click engaging portions formed in the other one of the detection unit and the carriage. The clicks engage with the click engaging portions, whereby the detection unit is snap-locked to the carriage. This enables the detection unit of the magnetic linear encoder to be readily attached to the carriage and besides, when attached, prevents disorder of the information magnetized to the scale element. Further, even when a position of the carriage shifts corresponding to sheets having different thicknesses, a sliding load of the carriage does not change. Deformation and abrasion of the scale element of the magnetic linear encoder are restrained as much as possible. Moreover, the abrasion of bearings of a head of the magnetic linear encoder is eliminated.

17 Claims, 21 Drawing Sheets

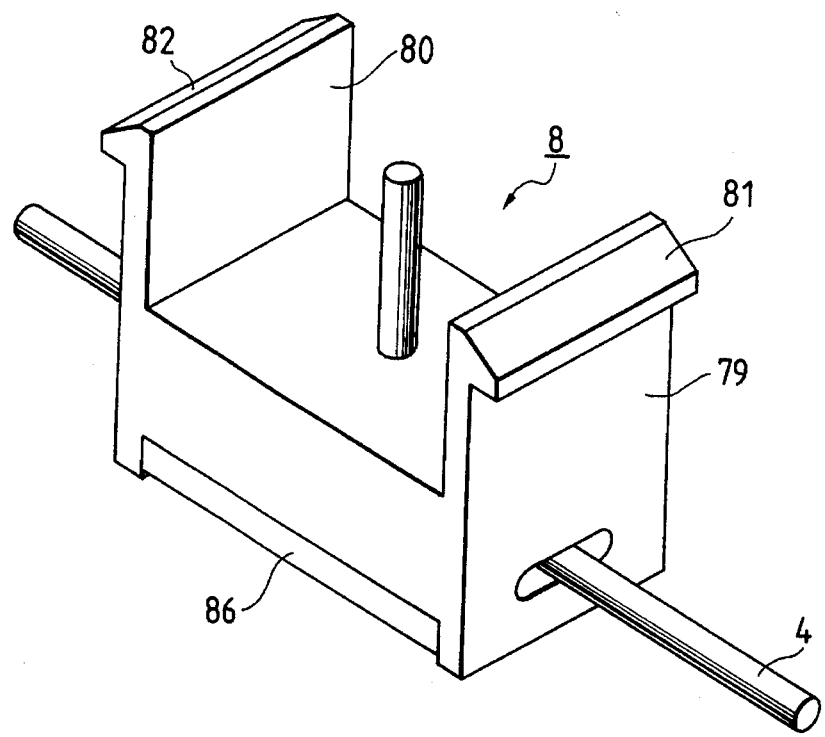
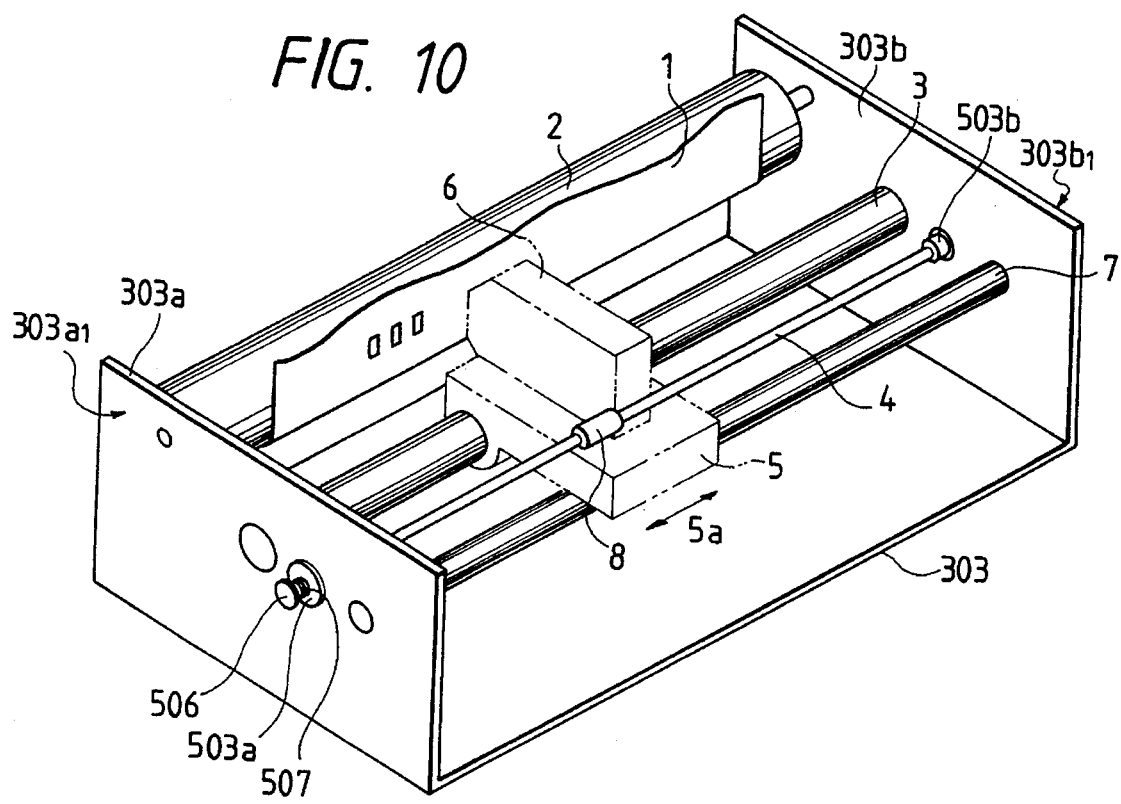

RECORDING APPARATUS WITH DETACHABLE MAGNETIC SENSOR

This application is continuation of application Ser. No. 08/141,520, filed Oct. 27, 1993, now abandoned.

BACKGROUND OF THE INVENTION

1. Field of the Invention

The present invention relates to a recording apparatus including a magnetic linear encoder for detecting a position and a velocity of a carriage mounted with a recording head.

2. Related Background Art

A generally known practice in the conventional recording apparatus is that detecting a position and a velocity of a carriage mounted with a recording head involves the use of an optical linear encoder and a magnetic linear encoder.

The optical linear encoder includes a scale element composed of a slit-like film on the side of an apparatus body. The carriage moving relatively to this scale element is mounted with a reading unit consisting of a transmissive or reflective sensor. This optical encoder is simple but fragile against dust. Further, high-density slits are limited in terms of a working accuracy in working based on an etching system or a laser working system. This leads to remarkably high costs for obtaining the high working accuracy.

Contrastingly, the magnetic linear encoder is capable of reading in a non-contact manner and more resistive against dust than the optical linear encoder. In addition, a magnetization density can be increased more easily in the magnetic linear encoder than in the optical one.

One of the points to which attention is particularly paid when using the magnetic linear encoder is a gap between an MR device (ferromagnetic substance magneto-resistance effect device) and the scale element. The magnetic encoder is constructed such that both ends of the scale element magnetized are fixed to the apparatus body, and the detection unit consisting of the MR device is fixed onto the carriage moving relatively to this scale element by use of a screw or the like. FIG. 27 illustrates how the scale element of the magnetic linear encoder is attached to the recording apparatus body. Referring to FIG. 27, a recording head (hereinafter simply termed a head) 101 is fixed to a carriage 102. This carriage 102 is supported and guided by guide shafts 104, 105. The carriage 102 is driven in arrowed directions A, B by means of a driving motor (unillustrated) through a timing belt (not shown). Recording is effected by the recording head 101 on a recording medium 106. The guide shafts 104, 105 are fixed to side plates 103a, 103b of the recording apparatus body. The head 107 of the magnetic linear encoder is fixedly positioned with respect to the carriage 102. Both ends of a scale element 108 of the magnetic linear encoder are fixedly positioned to the side plates 103a, 103b by support members 108a, 108b.

Further, according to another example of the method of attaching the scale element of the magnetic linear encoder to the recording apparatus body, as illustrated in FIG. 28, one end of the scale element is fixed, while the other end thereof is provided with a spring 207 for giving a tension to the scale element 4.

In the conventional examples, however, the detection unit of the magnetic linear encoder is fixed to the carriage with the screw or the like. Tools such as a driver, etc. are therefore required. Besides, the scale element of the magnetic linear encoder has a weak point that the magnetized information is damaged due to a contact with a substance bearing magnetism. As explained earlier, when using the driver for fixing the detection unit, the driver mistakenly comes into contact with the scale element, resulting in such a problem that the magnetized information of the scale element is disordered.

Further, the recording apparatus, when employing sheets having different thicknesses, may take the following methods. The recording head mounted on the carriage and the surface of the sheet are kept at a fixed distance. For this purpose, the carriage is rotated about a carriage shaft. The carriage shaft is moved back and forth with respect to the sheet. In this case, the detection unit is fixed to the carriage and therefore moves with a movement of the carriage. Both ends of the scale element are, however, fixed to the recording apparatus body, and, therefore, the scale element does not move with the movement of the carriage. Accordingly, both ends of the scale element and the detection unit on the carriage are not aligned. As a result, an extra load is exerted on the movement of the carriage in the scan direction. Additionally, there arises a problem in which this causes a deformation of the scale element and abrasion of the bearings at both edges of the detection unit.

Moreover, the detection unit is constructed of the MR device, a holding portion for this MR device and oil-impregnated bearings press-fitted in both edges of this holding portion. A gap, i.e., the most important element to this magnetic linear encoder, between the MR device and the scale element is determined by the above components. However, an accuracy on the order of several 10 microns is demanded. Consequently, there exists a problem in which the accuracy is harder to obtain with a larger number of components.

Further, the conventional method of attaching the scale element of the magnetic linear encoder to the recording apparatus body presents such a problem that the sliding load of the carriage increases in a position close to the side plate in the following cases. The scale element of the magnetic linear encoder is attached in non-parallel to the guide shaft. There deviate the fitting positions of the support members for the scale element of the magnetic linear encoder and of the head. This will hereinafter be described in detail with reference to FIGS. 29 to 31.

FIG. 29 is a schematic plan view showing a state where the scale element of the magnetic linear encoder is attached in non-parallel to the guide shaft. FIG. 30 is a schematic plan view showing a state where there deviate the mounting positions of the scale element of the magnetic linear encoder and of the head.

Referring to FIG. 29, the guide shaft 104 is not in parallel to the scale element 8 of the magnetic linear encoder. The carriage 102 is guided by the guide shaft 104 and moved to an area a or b in the vicinity of a side plate 103a or 103b. At this time, the head 107 is fixed to the carriage 102. Therefore, it follows that the scale element 108 undergoes flexures of approximately $1_1$, $1_2$ in the respective areas. FIG. 31 shows a sliding load characteristic of the carriage with respect to a carriage position. As illustrated in FIG. 31, the sliding load of the carriage with respect to the carriage position becomes approximately $L_a$, $L_b$ in the vicinities of the side plates 103a, 103b. It follows that an increase in the sliding load is considerably greater than a load $L_0$ when the carriage is located in the vicinity of the center.

Further, similarly in the case where there deviate the mounting positions of the scale element of the magnetic linear encoder and of the head, the carriage 102 is guided by the guide shaft 104 and moved to the areas a, b in the vicinities of the side plates 103a, 103b. At this time, the head is fixed to the carriage 102. Hence, it follows that the scale element 108 undergoes a flexure of approximately $l_1$ in the respective areas. Similarly in the above-mentioned case, as shown in FIG. 31 of the sliding load characteristic of the carriage with respect to the carriage position, the sliding load of the carriage with respect to the carriage position becomes about $L_a$ in the vicinities of the side plates 103a, 103b. It follows that the sliding load increases well above the load $L_0$ when the carriage is located in close proximity to the center.

The above fluctuations in the sliding load of the carriage conduce to vibrations when the carriage makes a motion at a constant speed. Further, serious problems arise, wherein noises are produced when the carriage moves, and a printing quality declines.

Furthermore, the sliding load between the scale element of the magnetic linear encoder and the head fluctuates (and simultaneously augments). Consequently, the following serious problems are also caused. The bearings of the head are abraded, and an air gap between the MR device and the magnetized portion is narrowed enough to break down the MR device or reversely widened enough to worsen a reading condition.

Moreover, another conventional method of attaching the scale element of the magnetic linear encoder to the recording apparatus body has defects which follow. A large number of parts involves a laborious assembly. Needed also is an operation to keep the parallelism with the shaft for guide-moving the carriage in the scan direction. This is a factor for an increase in costs.

SUMMARY OF THE INVENTION

It is a primary object of the present invention, which obviates the above-stated defects, to provide a recording apparatus capable of facilitating attachment of a detection unit of a magnetic linear encoder to a carriage and preventing magnetized information of a scale element from being disordered.

It is another object of the present invention to provide a recording apparatus capable of restraining a deformation and abrasion of the scale element of the magnetic linear encoder as much as possible without any change in sliding load of the carriage even when a carriage position is shifted corresponding to sheets having different thicknesses.

It is still another object of the present invention to provide a recording apparatus capable of giving a highly accurate gap between an MR device and the scale element.

It is a further object of the present invention to provide a recording apparatus capable of high-quality recording while stably employing the magnetic linear encoder by preventing the disorder of the magnetic recording information due to the abrasion of the scale element.

BRIEF DESCRIPTION OF THE DRAWINGS

Other objects and advantages of the present invention will become apparent during the following discussion in conjunction with the accompanying drawings, in which:

FIG. 9 is a view showing a state where the bearing of the detection unit illustrated in FIG. 7 is integrally formed;

FIG. 10 is a perspective view of the recording apparatus incorporating the magnetic linear encoder in a third embodiment of this invention;

DETAILED DESCRIPTION OF THE PREFERRED EMBODIMENTS

Figure 1:
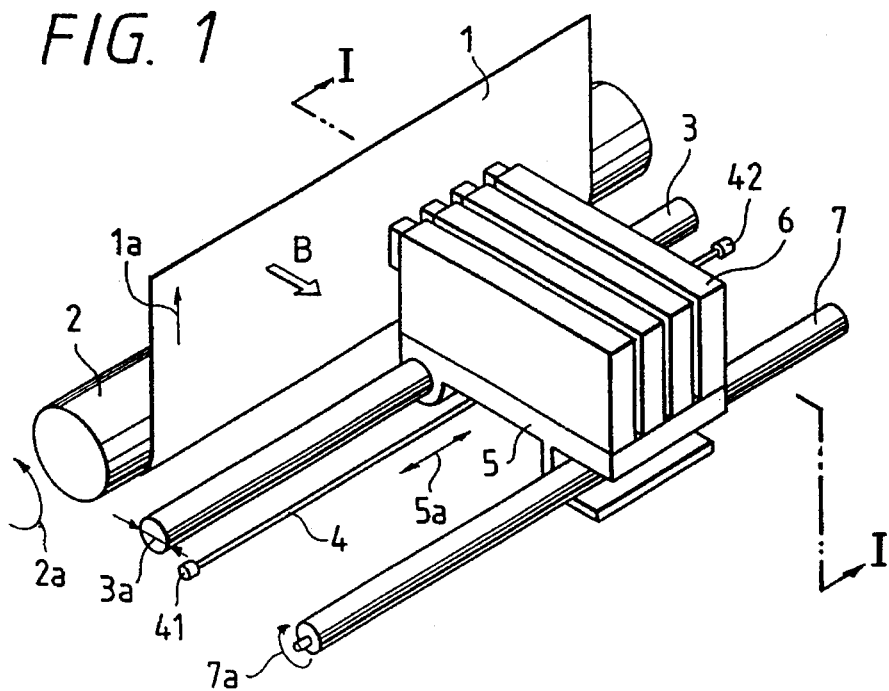
FIG. 1 is a perspective view showing the principal portion of a recording apparatus incorporating a magnetic linear encoder in a first embodiment of the present invention.

Preferred embodiments of the present invention will hereinafter be described with reference to the drawings. Referring to FIGS. 1 to 4, a first embodiment of this invention will be discussed. FIG. 1 illustrates the principal portion of a recording apparatus of this invention. Referring to FIG. 1, the numeral 1 designates a sheet of paper or recording medium on which recording is effected. A sheet feed roller 2 feeds the sheet of the paper 1. A guide shaft 3 is provided in face-to-face relationship with the sheet feed roller. The numeral 4 represents a scale element of a magnetic linear encoder which is provided in face-to-face relationship with the guide shaft 3. A carriage 5 moves along the guide shaft 3. A recording head 6 mounted on the carriage 5 performs recording on the sheet 1. A support shaft 7 holds a posture of the carriage 5 rotatable about the guide shaft 3.

Given next is an outline of operation based on the above construction. The sheet 1 is fed to a predetermined position with a rotation of the sheet feed roller 2 in the direction of arrow 2a. Thereafter, every time one-line recording is conducted by the recording head 6, the sheet 1 is fed by a predetermined quantity in the direction of arrow 1a. The carriage 5 moves along the guide shaft 3 in the directions of arrow 5a. Recording is effected on the sheet 1 by means of the recording head 5 mounted on the carriage 5 in accordance with a position and a velocity of the carriage 5. At this time, a detection unit 8, shown in FIGS. 2 through 4, of the magnetic linear encoder installed on the carriage 5 detects information of the scale element 4, thereby detecting a position and a velocity of the carriage 5.

Figure 2:
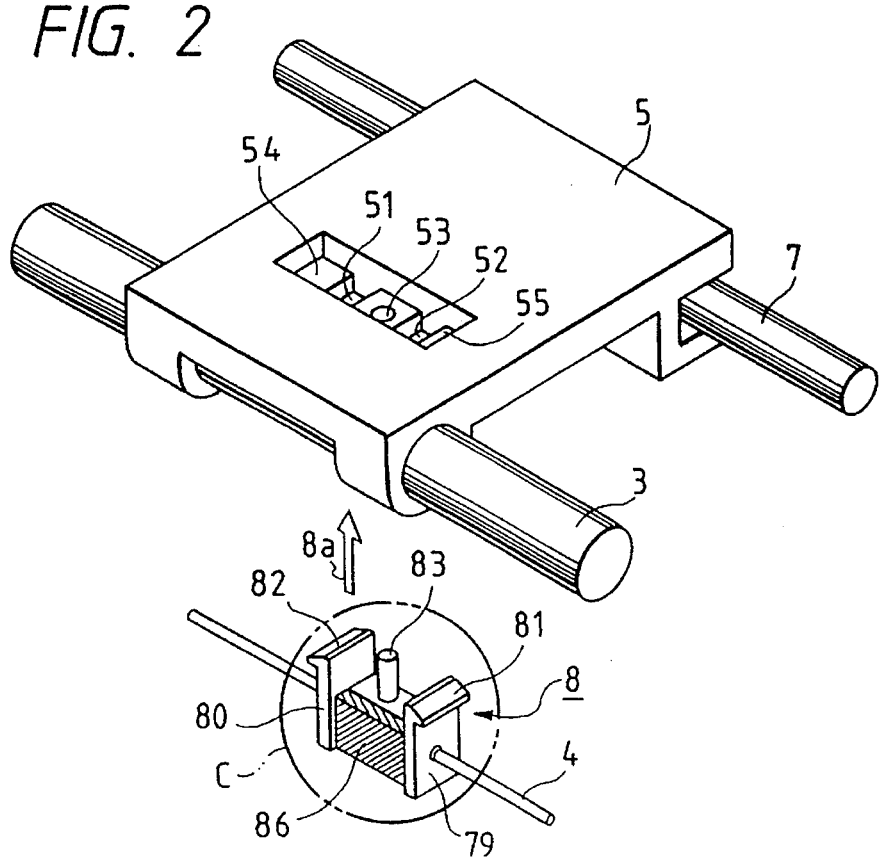
FIG. 2 is a view showing a state how a detection unit of the magnetic linear encoder illustrated in FIG. 1 is attached to a carriage.

Herein, the detection unit 8 serving as a magnetic head will be explained with reference to FIGS. 2 through 4. FIG. 2 is a view best illustrating a characteristic of the present invention. FIG. 2 is a perspective view of the carriage as viewed in the direction of arrow B of FIG. 1. For a better observation of how the detection unit 8 of the magnetic linear encoder is installed on the carriage 5, there is shown a state where the recording head 6 on the carriage 5 is demounted. Note that the parts incorporating the same functions as those of the parts shown in FIG. 1 are marked with the like numerals in FIG. 2. Turning to FIG. 2, the detection unit 8 of the magnetic linear encoder includes clicks 81, 82 provided at both ends thereof. That is, click-forming plates 79, 80 formed upward with the clicks 81, 82 are provided at both edges. A protrusion 83 is provided at the center of the detection unit 8. On the other hand, the carriage 5 is formed with square holes 51, 52, a round hole 53 and seats 54, 55. Mounting the magnetic linear encoder on the carriage involves the following steps. The scale element 4 of the magnetic linear encoder is inserted through the detection unit 8 of the magnetic linear encoder. The detection unit 8 is moved in an arrowed direction 8a. The clicks 81, 82 are inserted through the square holes 51, 52 while fitting the protrusion 83 into the round hole 53. Thereafter, the detection unit 8 is pulled back in the opposite direction, with the result that the clicks 81, 82 are caught by the seats 54, 55. The detection unit 8 is thus snap-locked to the carriage 5.

Figure 3:
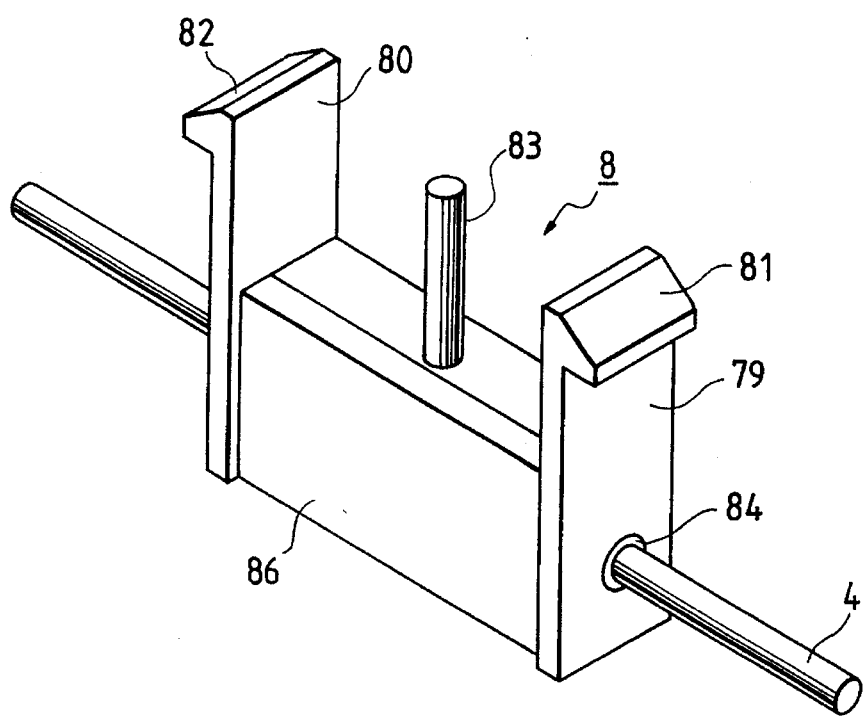
FIG. 3 is a view showing in detail the detection unit of the magnetic linear encoder illustrated in FIG. 1.
Figure 4:
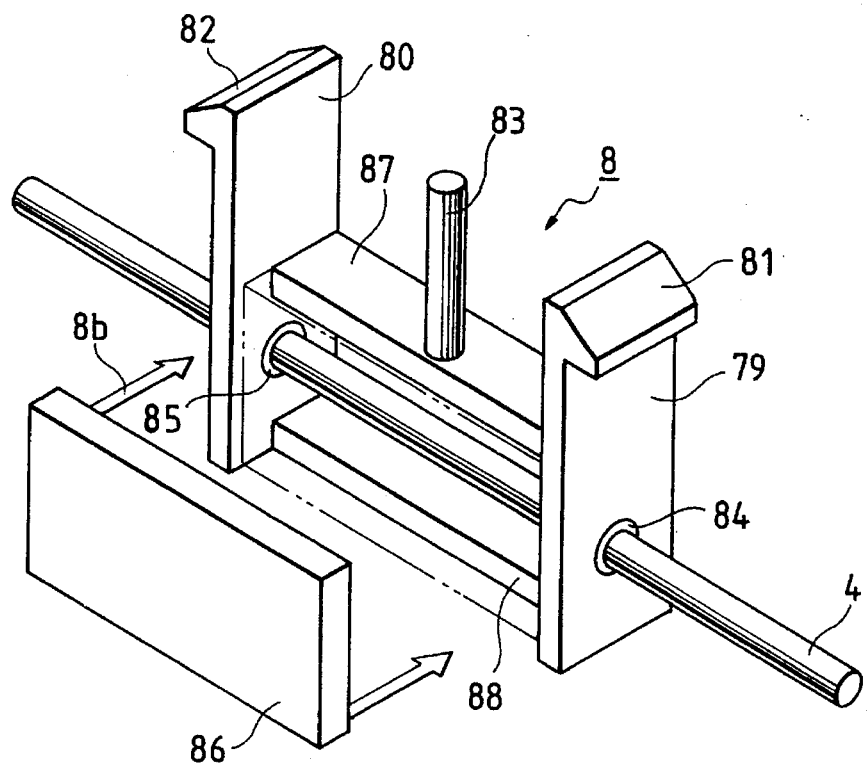
FIG. 4 is a view depicting an internal configuration of the detection unit of the magnetic linear encoder shown in FIG. 3.

FIG. 3 is an enlarged perspective view of an encircled portion C. FIG. 4 is an explanatory perspective view illustrating an internal structure of the detection unit 8 of the magnetic linear encoder, wherein an MR device 86 is demounted therefrom. Incidentally, the parts having the same functions as those of the parts shown in FIG. 2 are marked with the like numerals in FIGS. 3 and 4. Paying attention to FIGS. 3 and 4, bearings 84, 85 provided at both edges of the detection unit 8 serve for movements of the detection unit 8 along the scale element 4. These bearings are made of a material exhibiting an excellent abrasion resistibility and slidability as well. Further, the bearings 84, 85 are highly accurately positioned with respect to perpendicular flat surfaces 87, 88 of up-and-down plates constituting the detection unit 8. The bearings 84, 85 are attached to the click-forming plates 79, 80 provided at both edges of the detection unit 8. A high gap-accuracy between the scale element 4 and the MR device 86 can be obtained simply by, as indicated by an arrowhead 8b, closely fitting the MR device 86 to the flat surfaces 87, 88 and thus mounting it in the detection unit 8. Further, an output signal from the detection unit 8 of the magnetic linear encoder is fetched outside through a lead wire (not shown) or a flexible substrate (not shown).

Figure 5:
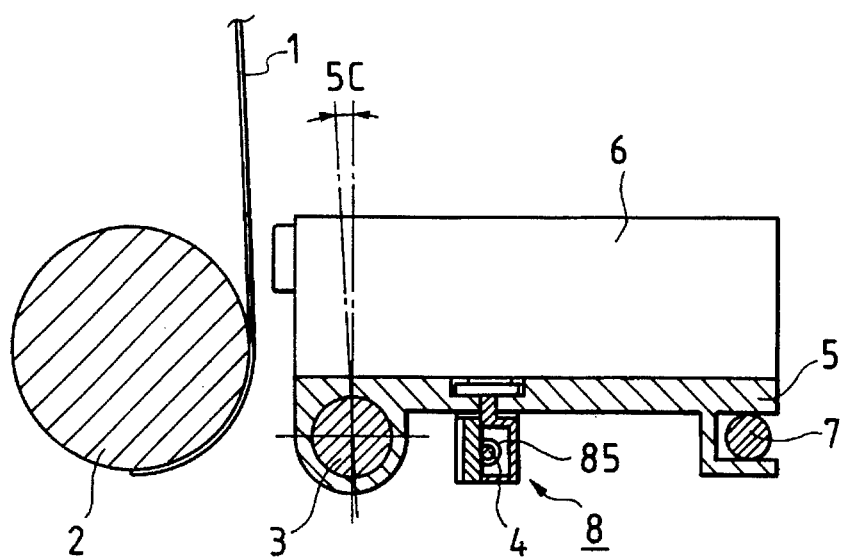
FIG. 5 is a sectional view taken along the line 1—1, showing the apparatus of FIG. 1 in a second embodiment of this invention.

A second embodiment of the present invention will next be explained with reference to FIGS. 1 and 5 through 7. Referring again to FIG. 1, the recording sheet 1 and the recording head 6 are kept at a predetermined distance. The distance therebetween may sometimes varied with a change in thickness due to a difference of type of the sheet 1. For compensating the variation in the distance, some of the recording apparatuses adopt the following construction. The support shaft 7 is, as depicted in FIG. 1, formed as an eccentric shaft. This support shaft 7 is rotated in the direction 7a, thereby changing a position of a rear portion of the carriage 5. In consequence, as illustrated in FIG. 5, the carriage 5 is rotated in the direction 5c about the guide shaft 3. As a result, the distance between the sheet 1 and the recording head 6 is regulated. In addition, as depicted in FIG. 1, the guide shaft 3 is moved in parallel in the direction of arrow 3a, thus regulating the distance between the sheet 1 and the recording head 6. Note that FIG. 5 is a sectional view taken along the line 1—1 of FIG. 1.

In the recording apparatus in which the distance is regulated with a rotation of the carriage among those incorporating the above mechanism for regulating the distance between the sheet and the recording head, as illustrated in FIG. 5, the bearing 85 in the detection unit of the magnetic linear encoder is moved with the rotation of the carriage 5. In FIG. 5, a trace of moving amount thereof is given in the horizontal direction, but the amount is on the order of several mm in the up-and-down directions. Incidentally, turning to FIG. 1, the end portions 41, 42 of the scale element 4 of the magnetic linear encoder are fixed to a frame (unillustrated) of the recording apparatus body. Hence, it follows that an unnecessary load is applied to the movement along the guide shaft 3 of the carriage 5 due to the above-mentioned movement of the bearing 85. Further, this is a factor to cause an increase in the abrasions of the bearing 85 and the scale element 4. Under such circumstances, as shown in FIG. 6, the bearing takes a shape of an elongate hole extending in the vertical direction in place of the round hole.

Figure 6:
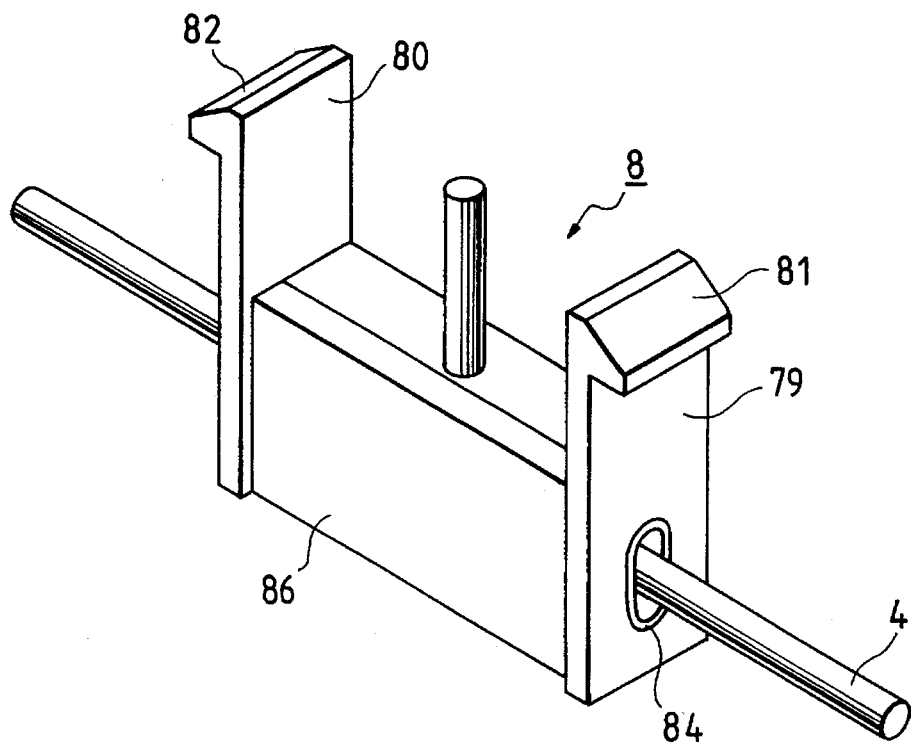
FIG. 6 is a view showing a bearing, assuming a vertically elongate hole, of the detection unit of the magnetic linear encoder illustrated in FIG. 5.

With the above construction adopted, there is applied no load from the scale element 4 even when the detection unit 8 shifts in the up-and-down directions with the rotation of the carriage in FIG. 6. Further, a crosswise dimension of the elongate hole is in clearance-fit relationship with a diameter of the scale element 4, and, therefore, the scale element and the MR device 86 are kept at a fixed distance. A trace of crosswise shift of the detection unit 8 is caused with the rotation of the carriage, thereby undergoing no load from the scale element 4.

Figure 7:
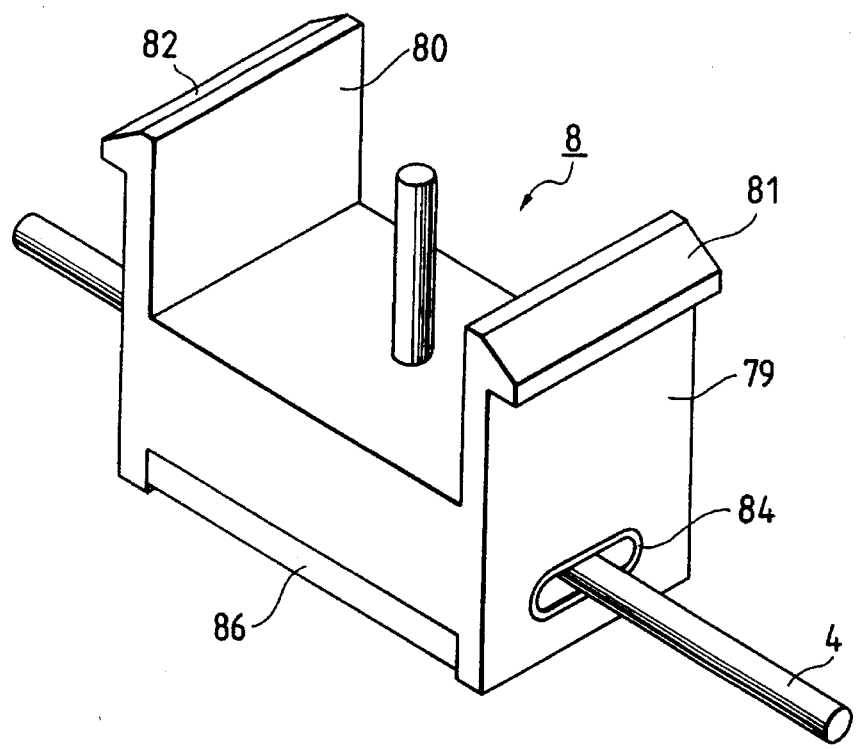
FIG. 7 is a view showing a bearing, assuming a horizontally elongate hole, of the detection unit of the magnetic linear encoder illustrated in FIG. 5.

In the recording apparatus in which the distance is regulated by a parallel movement of the guide shaft among those incorporating the mechanism for regulating the distance between the sheet and the recording head, the position of the detection unit of the magnetic linear encoder is also shifted with the parallel movement of the guide shaft. As a result, there is received an unnecessary load from the scale element of the magnetic linear encoder. This leads to a load on the movement of the carriage along the guide shaft. At the same time, this causes abrasions of the scale element of the magnetic linear encoder as well as of the bearing in the detection unit of the magnetic linear encoder. Then, as shown in FIG. 7, the internal holes of the bearing 84 and the opposite-side bearing 85 (not shown) change in terms of configuration from the round hole to crosswise elongate holes. In this case, when the MR device 86 is located in a position as illustrated in FIG. 6, the MR device 86 and the scale element 4 of the magnetic linear encoder are not kept at the fixed distance. Accordingly, an arrangement taken is that the MR device 86 is, as shown in FIG. 7, located downwardly of the scale element 4 of the magnetic linear encoder. By taking the above-stated arrangement, the guide shaft is moved in parallel to regulate the distance between the sheet and the recording head. For this purpose, even when the detection unit of the magnetic linear encoder shifts crosswise, no load is received from the scale element.

Figure 8:
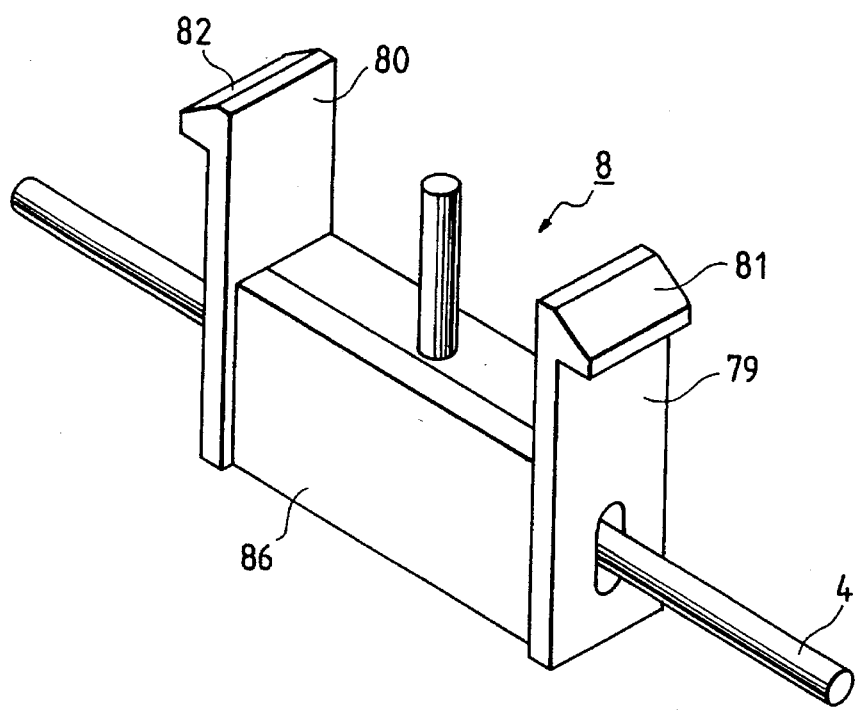
FIG. 8 is a view showing a state where the bearing of the detection unit illustrated in FIG. 6 is integrally formed.

Next, a third embodiment will be discussed with reference to FIGS. 8 and 9. The detection unit 8 of the magnetic linear encoder in the embodiments 1 and 2 discussed above is, as stated earlier, demanded to exhibit a considerably high accuracy in terms of the distance between the MR device and the scale element of the magnetic linear encoder. Accordingly, the bearing composed of a member having an excellent abrasion resistibility and slidability is press-fitted therein. As shown in FIGS. 8 and 9, the bearing composed of a different member is disused, and the click-forming plate itself which holds the bearing in the detection unit may be formed of a resinous material exhibiting a superlative abrasion resistibility and slidability. In this instance, a step of press-fitting the bearing is eliminated. This facilitates the assembly of the detection unit of the magnetic linear encoder.

Note that in the embodiment discussed above, the detection unit of the magnetic linear encoder is provided with the clicks and thereby snap-locked to the carriage. The clicks of the detection unit of the magnetic linear encoder are, however, disused. The clicks may be formed on the carriage, and the detection unit of the magnetic linear encoder may be snap-locked thereto. Further, in accordance with each embodiment, the single piece of protrusion is formed on the detection unit, and the single piece of round hole is formed in the carriage in order to determine the on-the-carriage position of the detection unit of the magnetic linear encoder in the carriage running direction. However, two pieces of protrusions may be provided on the detection unit, and the round and elongate holes may also be formed by ones in the carriage. In this case, more accurate positioning than in each embodiment discussed above can be attained. Moreover, the protrusion may be formed on the carriage, while a hole may also be formed in the detection unit of the magnetic linear encoder.

Figure 11:
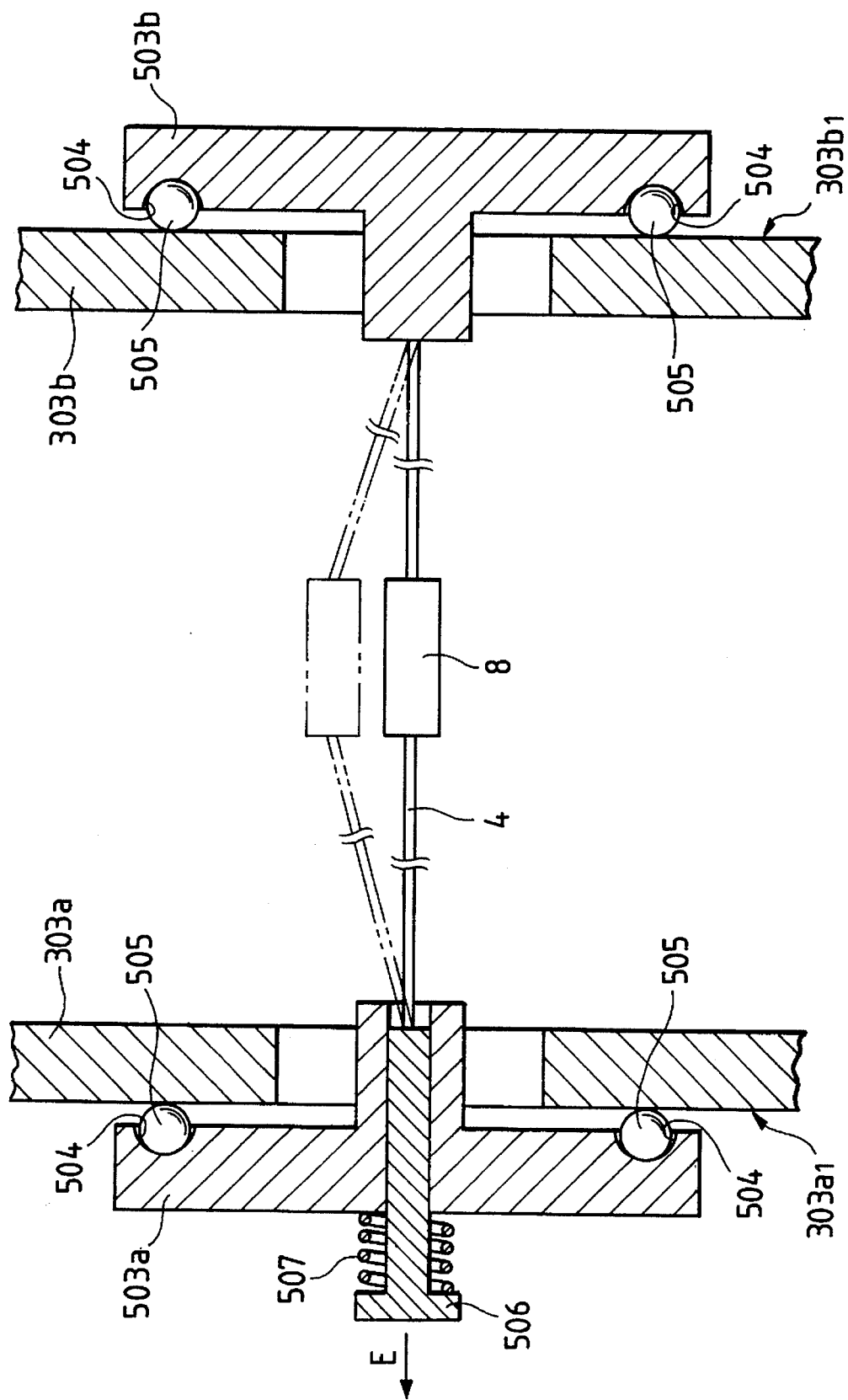
FIG. 11 is a view showing a state where the scale of the magnetic linear encoder depicted in FIG. 10 is fitted to side plates of the apparatus.

Next, a third embodiment of this invention will hereinafter be explained with reference to FIGS. 10 to 13. This embodiment is intended to reduce a sliding load of the carriage. FIG. 10 illustrates a recording apparatus employing the magnetic linear encoder. FIG. 11 is a sectional view showing how the scale element of the magnetic linear encoder depicted in FIG. 10 is mounted.

Paying attention to FIGS. 10 and 11, the carriage indicated by a one-dotted line is mounted with the recording head based on wire-dot-matrix printing, heat transfer printing, and ink jet printing. The carriage 5 is guided and supported by a carriage guide shaft 3 and a support shaft 7. The carriage 5 is then reciprocated by the directions of arrow 5a by a driving motor (unillustrated) in combination with a timing belt (unillustrated). The recording head 6 performs recording on a recording medium 1 fed while being wound on an outer peripheral surface of the sheet feed roller 2, thus forming letters, images, etc. thereon.

The sheet feed roller 2 is rotatably axially supported on side plates 303a, 303b of a chassis 303. The roller 2 is rotationally driven by the driving motor (not shown). The carriage guide shaft 3 and the support shaft 7 are fixedly positioned by the side plates 303a, 303b. The thus constructed carriage 5 is mounted with a magnetic linear encoder for detecting a position and a moving amount of the carriage. This magnetic linear encoder is constructed of a scale element 4 and a detection unit. The scale element 4 includes magnetized patterns magnetized to a wire-shaped magnetizing material with a pitch density on the order of, e.g., 180 dots/in (dpi) or 360 dpi. The detection unit consists of an MR device for reading the magnetized patterns of this scale element 4.

A support member 503b is fixed to one end of the scale element 4. A plurality of recesses 504 are formed in a surface which faces to the side plate 303b of the support member 503b. Balls 505 are set in these recesses 504, thus forming a roll bearing. On the other hand, a slider 506 is fixed to the other end of the scale element 4. This slider 506 is fitted to the support member 503a. A plurality of recesses 504 are formed in a surface which faces the side plate 303a of the support member 503a. The balls 505 are set in these recesses 504, thus forming a roll bearing. A tension spring 507 is interposed between the slider 506 and the support member 503a. The tension spring 507 biases the slider 506 in an arrowed direction E in the figure to read slackness of the scale element 501.

The support members 503a, 503b are formed with the roll bearings and therefore freely movable within planes of outer surfaces 303a1, 303b1 of the side plates 303a, 303b. Accordingly, both ends of the scale element 4 are constructed to be freely movable within the flat surfaces 303a1, 303b1. The scale element 4 is positioned in its longitudinal direction on the basis of the outer surface 303b1 of the side plate 303b. The scale element 4 is biased by the tension spring 507 in the direction of arrow E. For this reason, the scale element 4 is not slackened but contacts the reference surface 303b1. Further, a magnetic head 8 is fixed to the carriage 5.

With the construction described above, even if the magnetic head 8 deviates in its installing position with respect to the support members 503a, 503b (e.g., if the magnetic head 8 is in a position indicated by a two-dotted line in FIG. 11), and when the carriage 5 moves in the vicinities of the side plates 303a, 303b, the support members 503a, 503b are freely movable within the flat surfaces 303a1, 303b1. Hence, the alignment is automatically performed. There is no possibility to increase the sliding load of the carriage 5 in close proximity to the side plates 303a, 303b.

Moreover, even when the positions of the support members 503a, 503b of the scale element 4 are shifted due to vibrations and a fall or the like, the carriage 5 moves in close proximity to the side plates 303a, 303b. The self-alignment is reperformed. The sliding load of the carriage 5 is therefore kept at a fixed level all the time.

For enhancing the effect of the self-alignment, it is effective to move the carriage 5 outwardly of a normal moving range (e.g., a printing range) of the carriage 5, i.e., up to a position close to the side plates 303a, 303b once or a plurality of times before starting printing. Incidentally, if the members (503a, 503b, 505, 506, 507) at both ends of the scale element 4 are made of a conductive material, it follows that the scale element 4 electrically connects with the earthed side plates 303a, 303b. This results in an effective implementation of measures against radiation noises and electrostatic noises as well.

Figure 12:
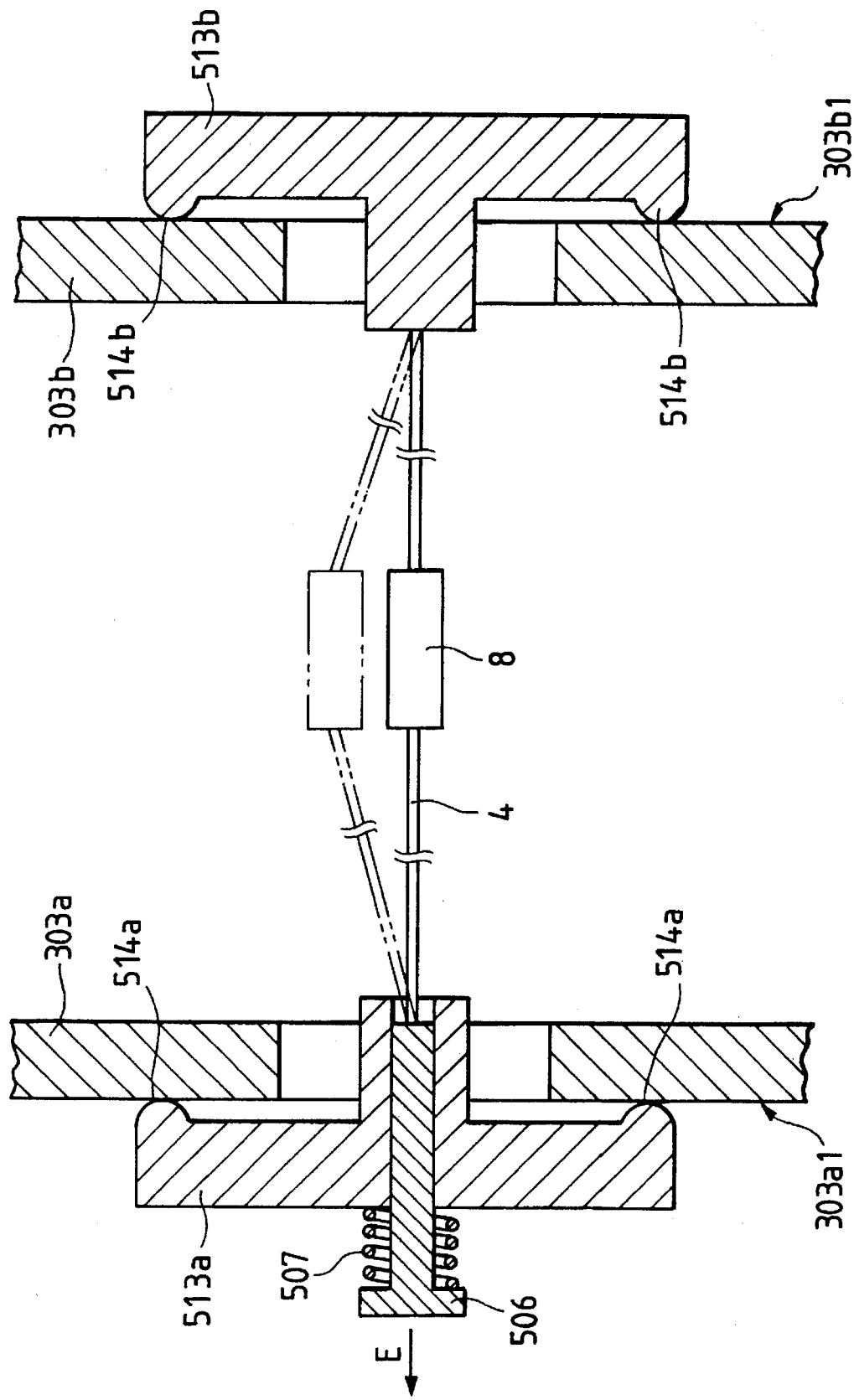
FIG. 12 is a view showing a modified example where the scale depicted in FIG. 11 is fitted to the side plates of the apparatus.

Herein, FIG. 12 illustrates a modified example where the scale element shown in FIG. 11 is attached to the side plates. Referring to FIG. 12, a support member 513b made of slidable plastic is fixed to one end of the scale element 4. A plurality of protrusions 514b are formed on the surface disposed in face-to-face relationship with the side plate 303b, thus forming a slide bearing freely movable within the outer surface 303b1 of the side plate 303b.

On the other hand, a slider 506 is fixed to the other end of the scale element 4. This slider 506 is fitted in the support member 513a. A plurality of protrusions 514a are formed on the surface which faces the side plate 303a of the support member 513a, thus forming a slide bearing freely movable within the outer surface 303a1 of the side plate 303a. A tension spring 507 is interposed between the slider 506 and the support member 513a. The tension spring 507 biases the slider in the direction of arrow E in the figure to eliminate the slackness of the scale element 501. The magnetic head 8 is fixed to the carriage.

With the construction described above, when the carriage moves in the vicinities of the side plates 303a, 303b, the support members 513a, 513b at both ends of the scale element 4 are automatically adjusted. It is thus possible to prevent the increment in the sliding load when the carriage moves in close proximity to the side plates 303a, 303b.

The material of the support members 513a, 513b involves the use of conductive plastic. The slider 506 and the tension spring 507 are made of a conductive material. Then, it follows that the scale element 4 electrically connects with the earthed side plates 303a, 303b. This results in the effective implementation of the measures against the radiation noises and the electrostatic noises.

Figure 13:
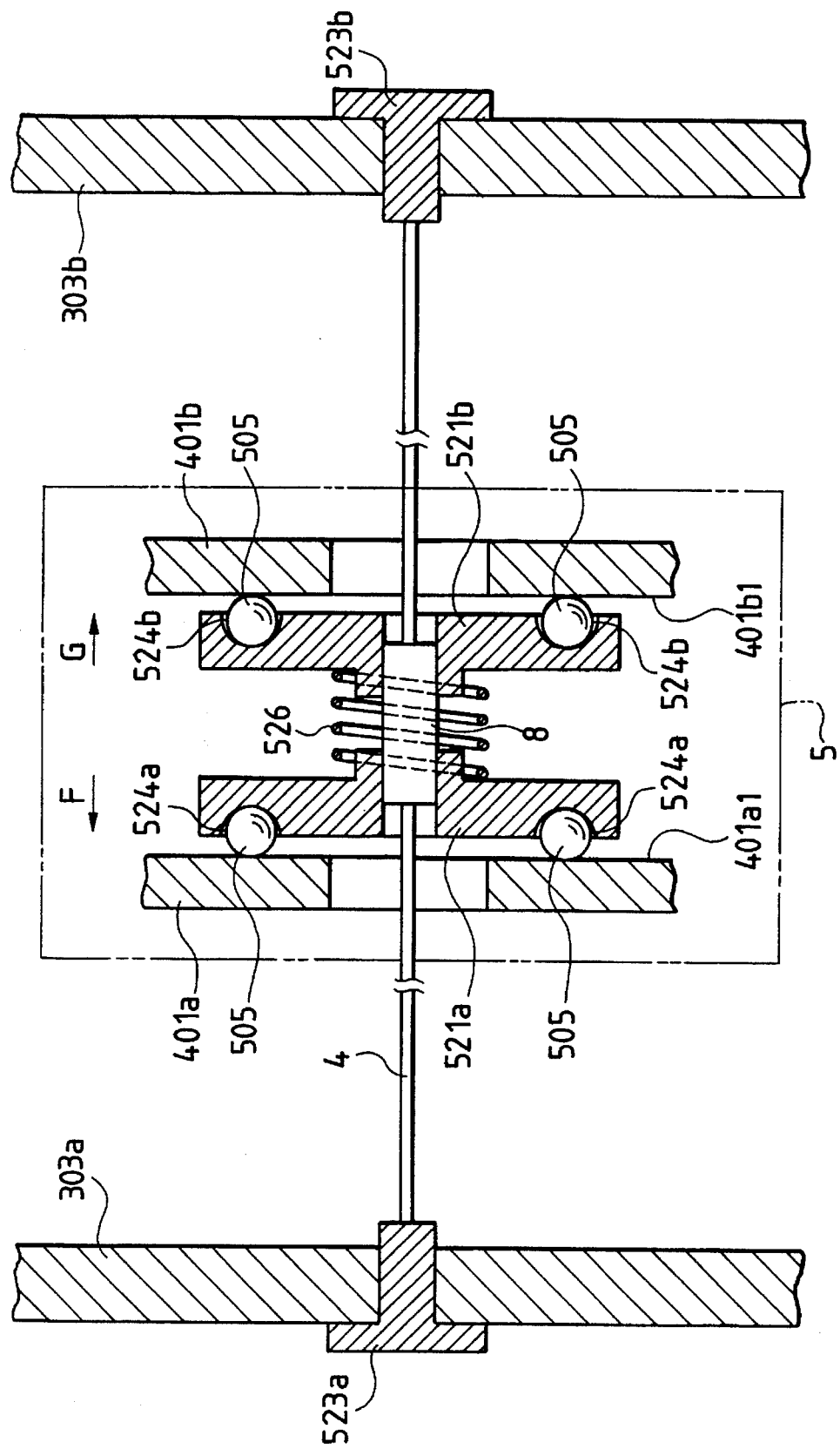
FIG. 13 is a view showing a state where the scale of the magnetic linear encoder is attached to the carriage in a fourth embodiment of this invention.

Next, a fourth embodiment of this invention will be described with reference to FIG. 13. The self-aligning function is incorporated in the third embodiment by providing the bearings at both ends of the scale element. If only one side of the moving range of the carriage is defined apart from the side plate, however, it is possible to obtain substantially the same effects as those in the third embodiment even when the end of the scale element on the apart-side of the carriage from the side plate is fixed to the side plate. In this case, the end of the scale element on the fixed side to the side plate is made fiducial in the longitudinal direction. This is preferable in terms of enhancing the accuracy. Besides, the scale element can also be positioned in the rotating direction on the fixed side.

The recording apparatus in this embodiment will next be explained with reference to FIG. 13. Referring to FIG. 13, holding members 523a, 523b are fixedly positioned to the side plates 303a, 303b at both ends of the scale element 4. The carriage 5 is provided with ribs 401a, 401b for fixing the magnetic head. One edge of the magnetic head 8 serving as a detection unit is fixed to a support member 521a. A plurality of recesses 524a are formed in the surface disposed in face-to-face relationship with an inner surface 401a1 of the rib 401a of the support member 521a. The balls are set in these recesses 524a, thus forming roll bearings. Further, the other edge of the magnetic head 8 is fitted in the support member 521b. A plurality of recesses 524b are formed in the surface disposed in face-to-face relationship with an inner surface 401b1 of the rib 401b of the support member 521b. The balls 505 are set in these recesses 524b, thus forming roll bearings. A compression spring 526 is interposed between the support members 521a, 521b. The compression spring 526 biases the support members 521a, 521b in the directions of arrow F and G, respectively, in the figure.

The inner surface 401a1 of the rib 401a is a fiducial surface for attaching the magnetic head 8 to the carriage 5. The support member 621 is formed with the roll bearings and therefore freely movable within the fiducial surface 401a1. The support member 521a is always biased by the compression spring 526 with respect to the fiducial surface in the longitudinal direction of the magnetic head 8. The support member does not therefore deviate therefrom.

Further, the support member 521b is also biased toward the inner surface 401b1 of the rib 401b. The support member 521b is, however, likewise formed with the roll bearings and therefore freely movable within the inner surface 401b1. Accordingly, the magnetic head 8 is movable within the plane with respect to the fiducial surface 401a1.

With the construction given above, when the carriage 5 moves in the vicinities of the side plates 303a, 303b, even if the magnetic head 8 deviates in its position with respect to the support members 523a, 523b of the scale element 4, the magnetic head 8 is freely movable within the plane of the fiducial surface 401a1. Hence, the alignment is automatically performed. Even when the carriage 5 moves in the vicinities of the side plates 303a, 303b, the sliding load does not increase. Incidentally, the same effects can also be obtained by such a construction that the support members 521a, 521b of the magnetic head are made of sliding plastic to form a roll bearing.

Next, a fifth embodiment of the present invention will be explained with reference to FIGS. 14 through 16.

This embodiment is intended to maintain a detection accuracy by reducing the number of parts.

Figure 14:
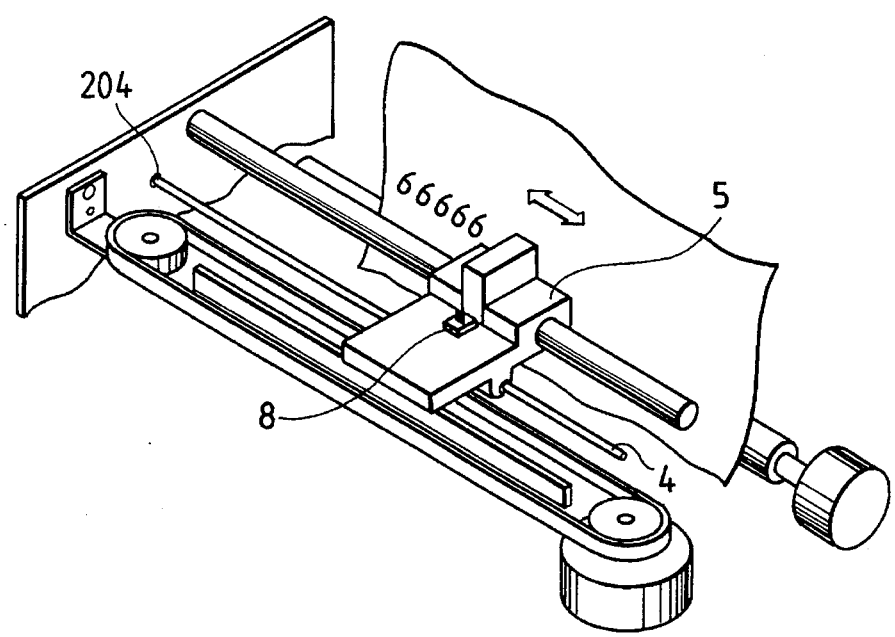
FIG. 14 is a perspective view of the recording apparatus incorporating the magnetic linear encoder in a fifth embodiment of this invention.
Figure 15:
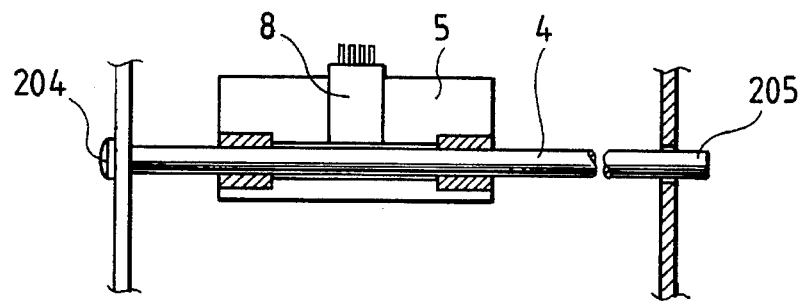
FIG. 15 is a view showing a state where the scale of the magnetic linear encoder depicted in FIG. 14 is fitted to the side plates of the apparatus.

Turning to FIGS. 14 and 15, one end of the scale element 4 of the magnetic linear encoder is fixed through, e.g., a screw 204 to the side plate of the recording apparatus body. The other end 205 of the scale element 4 is not fixed to the side plate but is a free end. Besides, the free end is inserted into a hole formed in the side plate of the recording apparatus body and slidably guided.

Figure 16:
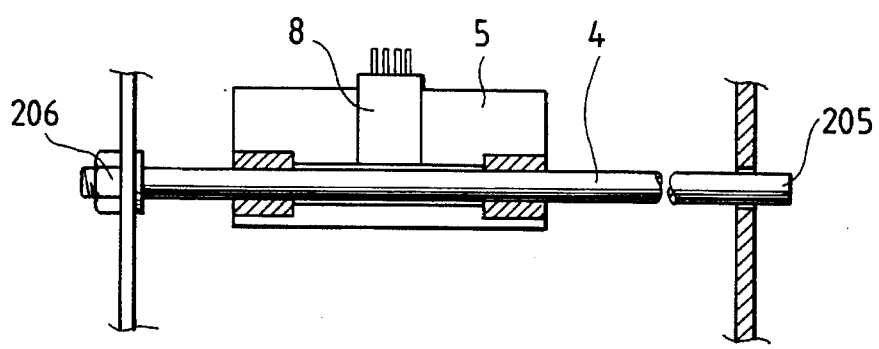
FIG. 16 is a view showing a modified example where the scale depicted in FIG. 15 is fitted to the side plates of the apparatus.

FIG. 16 illustrates a modified example where the scale shown in FIG. 15 is attached to the side plate of the apparatus. In this example, one end of the scale element 4 is fixed through a nut 206 to the side plate of the recording apparatus body, while the other end thereof is a free end similar to that of FIG. 15.

As obvious from the discussion given above, in accordance with the above embodiments of this invention, the recording apparatus is constructed such that the carriage mounted with the recording head moves along the guide shaft, thereby performing recording. In this recording apparatus, the detections of the position and velocity of the carriage involve exploiting the magnetic linear encoder constructed of the scale element made of the magnetic material undergoing the infinitesimal pitch magnetization and the detection unit consisting of the MR device. On this occasion, the detection unit of the magnetic linear encoder is made easily attachable to the carriage. Besides, when attached, the magnetizing information of the scale element is not disordered. The thus constructed recording apparatus is obtained.

Further, even when the carriage position shifts corresponding to sheets having different thicknesses, the scale element of the magnetic linear encoder does not exert an extra sliding resistibility to the carriage. A deformation and abrasion of the scale element of the magnetic linear encoder can be restrained as much as possible. The recording apparatus thus constructed is obtained.

Obtained further is the recording apparatus capable of giving a high accuracy of the distance between the MR device and the scale element.

Additionally, as explained in the embodiment for reducing the sliding load of the carriage, the present invention is constructed to effect the self-alignment of the magnetic head and the support members of the scale element of the magnetic linear encoder. It is therefore possible to obtain the recording apparatus capable of reducing load-fluctuations caused when moving the carriage and of silent and high-quality printing.

Moreover, reliability on the magnetic linear encoder can be improved by decreasing a slide friction between the scale element of the magnetic linear encoder and the bearing of the magnetic head. A recording apparatus having high quality and high reliability is obtained.

Additionally, the self-alignment is done, thereby eliminating the necessity for the highly-accurate parts and the adjustment after being assembled. The recording apparatus that is easy to assemble and inexpensive is acquired.

Moreover, one end of the scale element of the magnetic linear encoder is fixed, but the other end thereof is a free end. It is thus possible to reduce the number of parts and maintain the detection accuracy.

Figure 17:
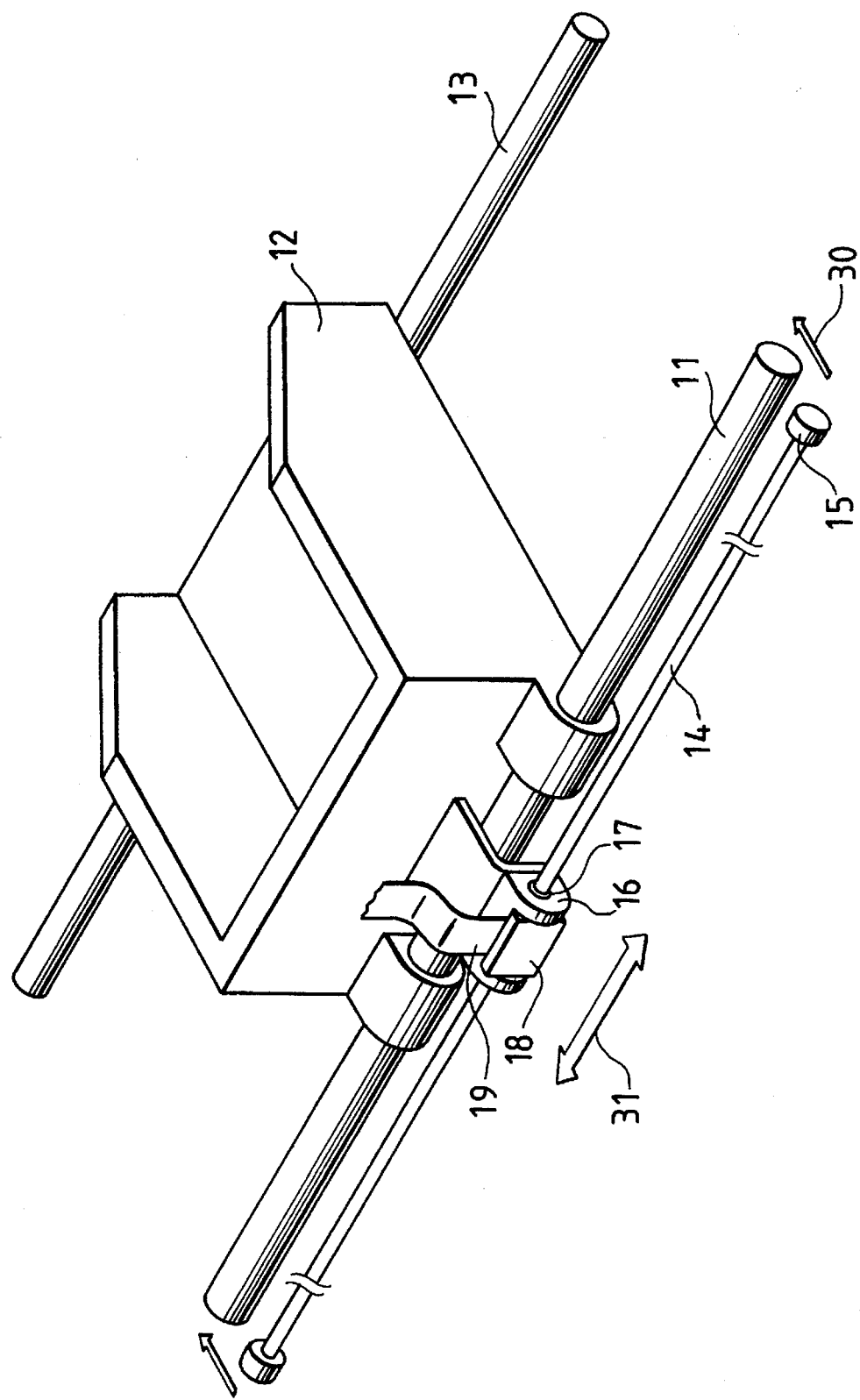
FIG. 17 is a perspective view showing the principal portion of the recording apparatus incorporating the magnetic linear encoder in a sixth embodiment of this invention.

Next, a sixth embodiment of the present invention will be described with reference to FIGS. 17 through 20. FIG. 17 depicts the principal portion of the recording apparatus. In the same figure, a guide shaft generally designated at 11 is provided in face-to-face relationship with the sheet feed roller (not shown). A carriage 12 moves along the guide shaft 11. A support shaft 13 holds a posture of the carriage 12 rotatable about the guide shaft 11. A scale element 14 of the magnetic linear encoder is provided facing to the guide shaft 11. A scale mounting member 15 serves fix the scale element 14 to the recording apparatus body. A slider 16 is snap-locked to the carriage 12 and moves along the scale element 14. Bearings 17 are provided at both ends of the slider 16. An MR device 18 is fixed to the slider 16 to keep a certain distance (e.g., several 10 micrometers) from the scale element 14 passing through the two bearings 17 of the slider 16. An FPC (Flexible Printed Circuit Board) 19 fetches an output of the MR device 18 to the outside.

Figure 18:
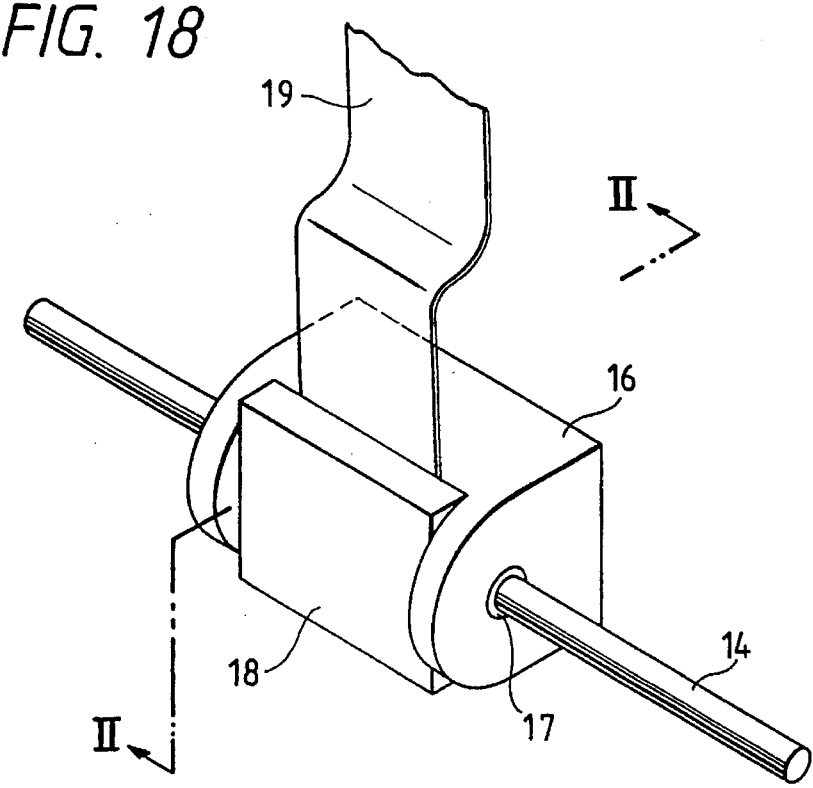
FIG. 18 is an enlarged view of a slider portion of the magnetic linear encoder depicted in FIG. 17.
Figure 19:
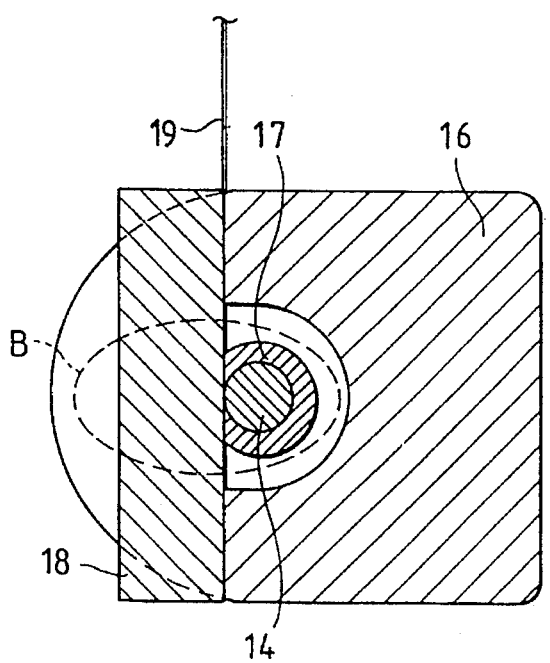
FIG. 19 is a sectional view taken along the line 11—11, showing the slider portion of FIG. 18.
Figure 20:
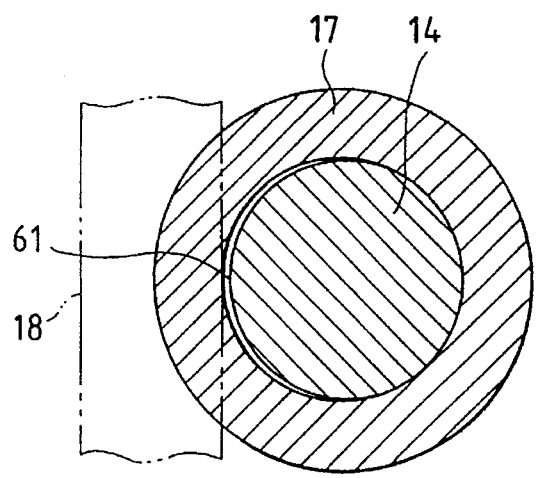
FIG. 20 is an enlarged view of a part B of the slider portion shown in FIG. 18.

FIG. 18 is an enlarged perspective view showing portions peripheral to the slider. FIG. 19 is a cross-sectional view taken along the line A—A of FIG. 18. FIG. 20 is a further enlarged sectional view of a part B of FIG. 19.

The carriage 12 moves along the guide shaft 11 in an arrowed direction 31. Recording is effected on a sheet (unillustrated) by means of a recording head (not shown) mounted on the carriage 12. On this occasion, the MR device 18 fixed to the slider 16 locked to the carriage 12 reads information magnetized to a portion 61 (see FIG. 20) facing the MR device 18 of the scale element 14, thereby knowing a position of the carriage 12.

There exists a possibility in which the scale element 14 and the bearings 17 abrade each other due to sliding. Particularly, the abrasion of the magnetized portion of the scale element 14 may probably cause disorder of the magnetized recording information. For preventing the abrasion of the magnetized portion 61, according to the present invention, the scale mounting member 15 is, when mounted on the recording apparatus body, fixed with a deviation from the center of the bearing 17 in an arrowed direction 30. In consequence of this, as illustrated in FIG. 20, the scale element 14 is pushed within the bearings 17 in the direction opposite to the MR device 18. The magnetized portion 61 of the scale element 14 does not therefore contact the bearings 17. The abrasion of the magnetized portion 61 can be thereby prevented.

The following is an explanation of a specific construction for fixing the scale element 14 by pushing the scale element 14 within the bearings 17 in the direction opposite to the MR device 18, with the scale mounting member 15 deviating from the center of the bearings 17 in the arrowed direction 30.

Figure 21:
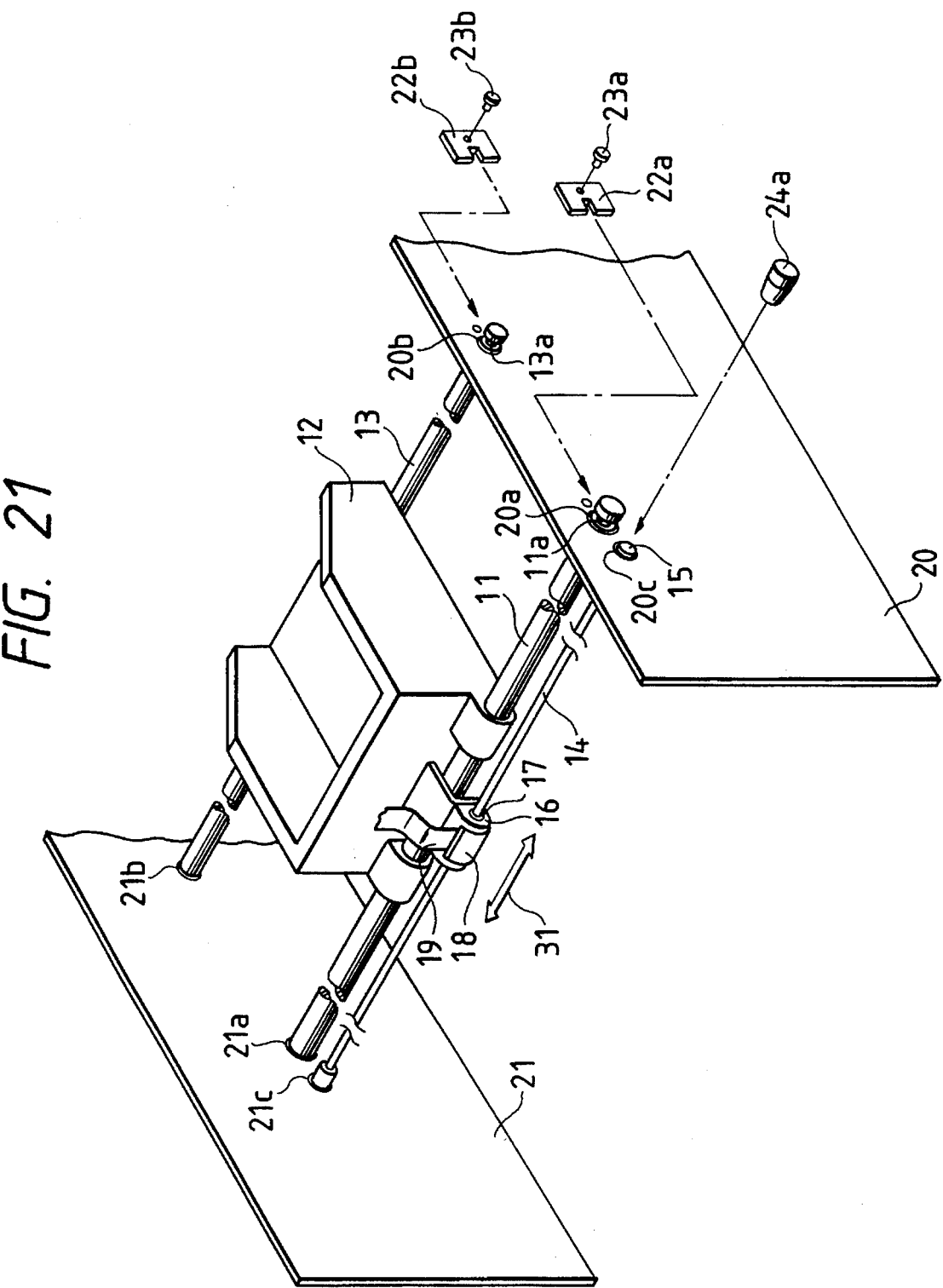
FIG. 21 is a view showing a first example where the scale of the magnetic linear encoder illustrated in FIG. 20 is fitted to the side plates of the apparatus with a deviation from the center of the bearing.

First Example:

Turning to FIG. 21, right and left side plates 20, 21 of the recording apparatus are formed with holes 20a, 20b, 20c, 21a, 21b, 21c for fitting the guide shaft 11, the support shaft 13 and the scale mounting member 15. One end of the guide shaft 11 is cut with a groove 11a for fitting a fitting member 22a. One end of the support shaft 13 is also cut with a groove 13a for fitting a fitting member 22b.

Figure 22:
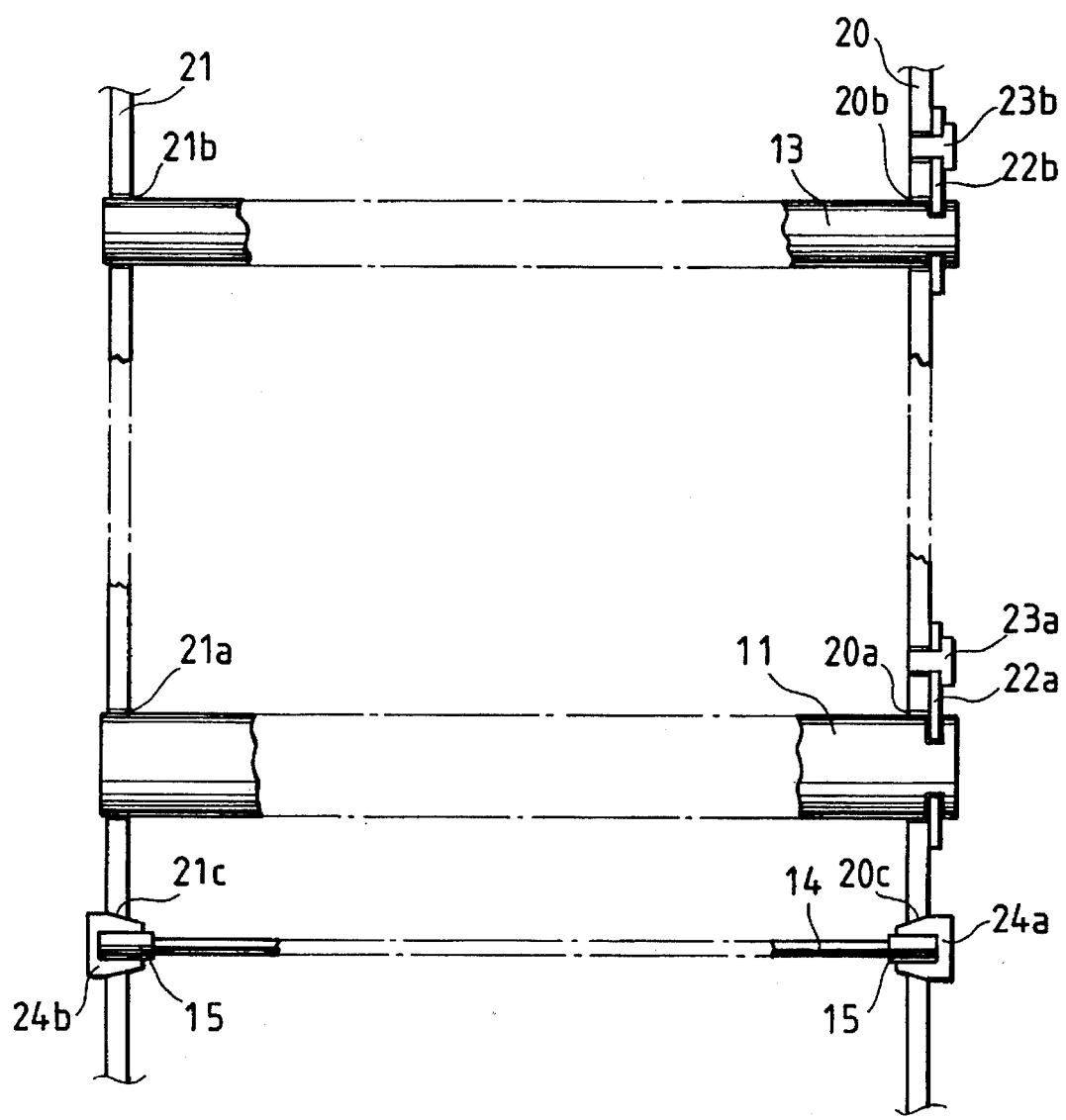
FIG. 22 is a sectional view of the right and left side plates depicted in FIG. 21.

Accordingly, the guide shaft 11 fitted with the carriage 12 and the MR device 18, the support shaft 13 and the scale mounting member are attached to the right and left side plates 20, 21 as follows. The guide shaft 11, the support shaft 13 and the scale mounting member 15 at the other end of the scale element 14 are fitted in the fitting holes 20a, 20b, 20c of the right side plate 20. Subsequently, the guide shaft 11, the support shaft 13 and the scale mounting member 15 at one end of the scale element 14 are fitted in the fitting holes 21a, 21b, 21c. Then, a notched portion of the fitting member 22a is fitted in the fitting groove 11a of the guide shaft 11. The fitting member 22a is fastened to the left side plate 21 with a screw 23a. Further, a notched portion of the fitting member 22b is fitted in the fitting groove 13a of the support shaft 13. The fitting member 22b is fastened to the right side plate 20 with a screw 23b. The guide shaft 11 and the support shaft 13 are thereby, as illustrated in FIG. 22, attached to the right and left side plates 20, 21.

Then, a fixing member 24a composed of an elastic material is fitted to the scale mounting member 15 located at the other end but in the fitting hole 20c of the right side plate 20. A fixing member 24b is fitted to the scale mounting member 15 located at one end but in the fitting hole 21c of the left side plate 21. The scale mounting members 15 of the scale element 14 are thus attached to the right and left side plates 20, 21. At this time, the positions of the fitting holes 20c, 21c of the right and left side plates 20, 21 are slightly shifted toward the guide shaft 11. Then, the fixing members 24a, 24b are fitted to the scale mounting members 15 at both ends. As depicted in FIG. 22, the scale mounting members 15 of the scale element 14 are attached to the right and left side plates 20, 21, whereby the scale element 14 can be fixed off the center of the bearing 17.

Figure 23:
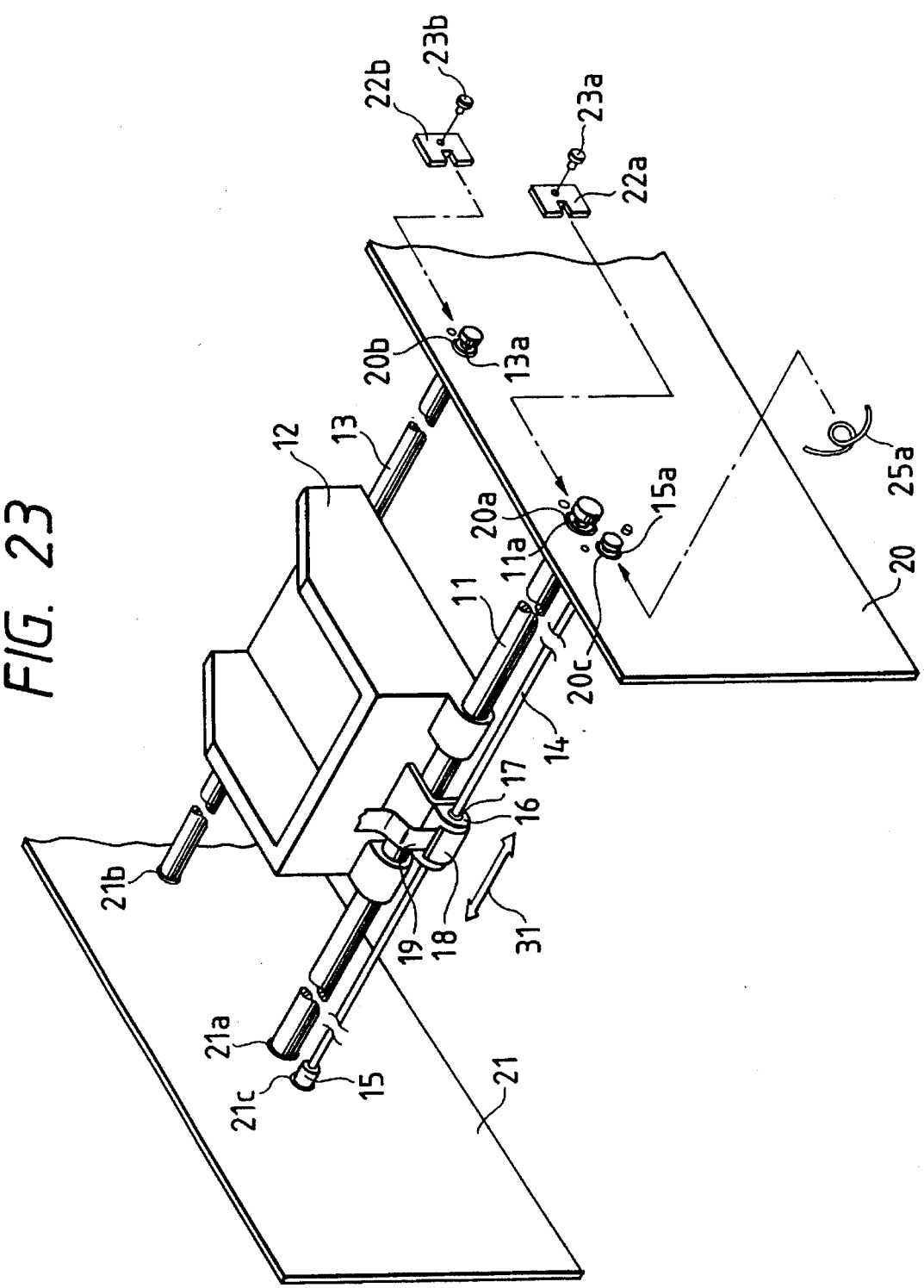
FIG. 23 is a view showing a second example where the scale of the magnetic linear encoder depicted in FIG. 20 is fitted to the side plates of the apparatus with a deviation from the center of the bearing.
Figure 24:
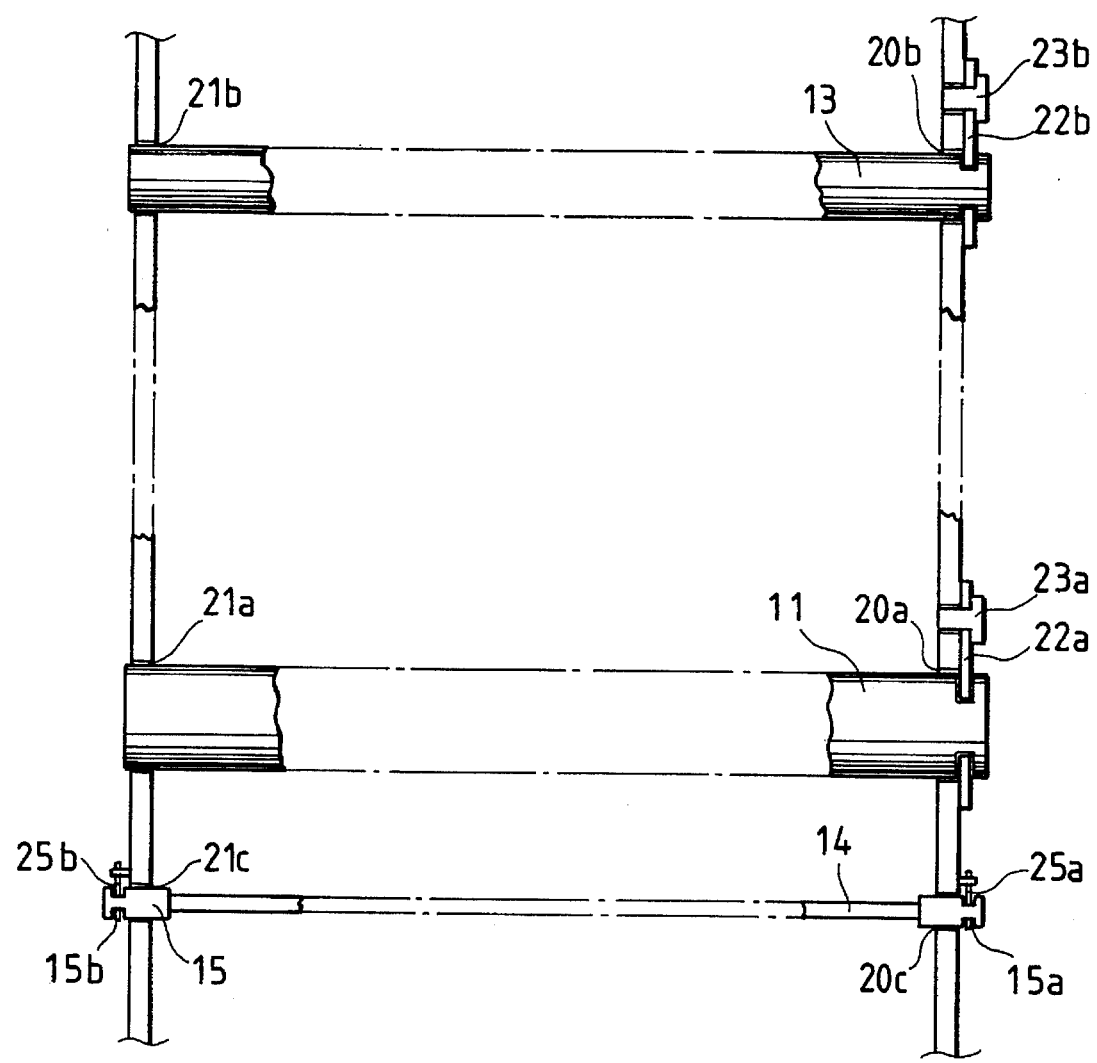
FIG. 24 is a sectional view of the right and left side plates illustrated in FIG. 23.

Second Example:

The first example provides the following arrangement. Shifted are the positions of the fitting holes 20c, 21c of the right and left side plates 20, 21. The elastic fixing members 24a, 24b are fitted to the scale mounting members 15 at both ends. The scale element 14 is thus set off the center of the bearing 17. In the second example, however, as depicted in FIGS. 23 and 24, grooves 15a, 15b for securing spring members 25a, 25b are formed in the scale mounting members 15 at both ends of the scale element 14. The spring members 25a, 25b are set in the grooves 15a, 15b of the scale mounting members 15 located at both ends but in the fitting holes 20c, 21c of the right and left side plates 20, 21. The scale mounting members 15 are thus shifted toward the guide shaft 11, whereby the scale element 14 can be fixed off the center of the bearing 17.

Figure 25:
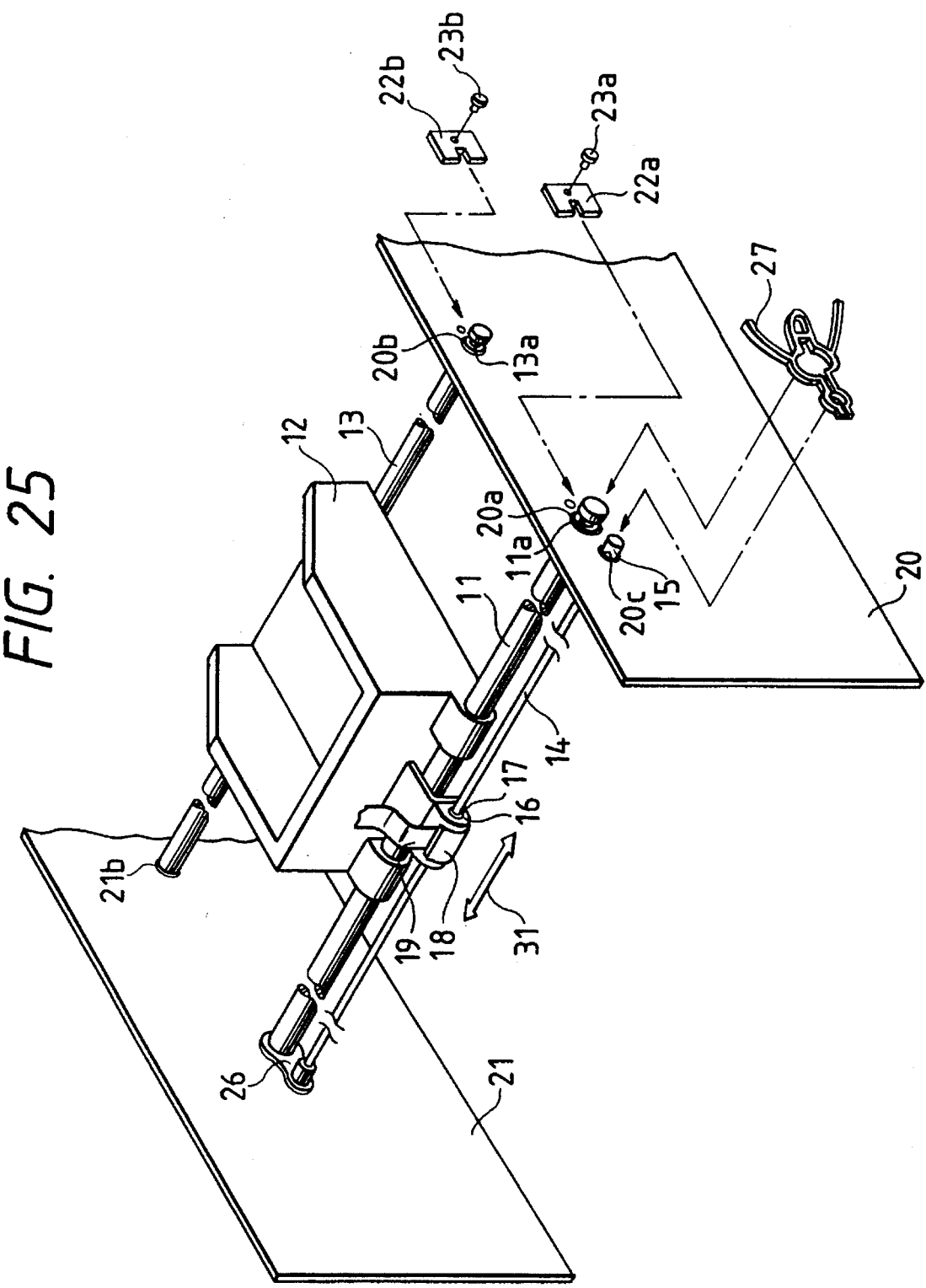
FIG. 25 is a view showing a third embodiment where the scale of the magnetic linear encoder illustrated in FIG. 20 is fitted to the side plates with a deviation from the center of the bearing.

Third Example:

In the second example, the scale mounting members 15 at both ends are provided with the spring members 25a, 25b. The scale mounting members 15 are thereby shifted towards the guide shaft 11. The scale element 14 is thus set off the center of the bearing 17. In the third example, however, as illustrated in FIG. 25, the scale mounting members 15 at both ends are provided with position regulating members 26, 27 for regulating a positional relationship with the guide shaft 11. A positional relationship between the MR device 8 and the guide shaft 11 is regulated with respect to a positional relationship between the MR device 8 and the guide shaft 11. The scale mounting members 15 are thereby slightly shifted toward the guide shaft 11. The scale element 14 can be thus fixed off the center of the bearing 17.

Incidentally, the following is a description of the position regulating members 26, 27. Before fitting the guide shaft 11, the support shaft 13 and the scale mounting members 15 at the other end of the scale element 14 into the fitting holes 20a, 20b, 20c of the right side plate 20, the guide shaft 1 and the scale mounting member 15 are insetted beforehand with the position regulating member 26. Further, the guide shaft 11, the support shaft 13 and the scale mounting member 15 at one end of the scale element 14 are inserted into the fitting holes 21a, 21b, 21c of the left side plate 21. The notched portion of the fitting member 22a is fitted in the fitting groove 11a of the guide shaft 11. The fitting member 22a is fastened to the left side plate 21 with the screw 23a. The notched portion of the fitting member 22b is fitted in the fitting groove 13a of the support shaft 13. The fitting member 22b is fastened to the right side plate 20 with the screw 23b. Thereafter, the position regulating member 27 seizes one end of the guide shaft 11 and the scale mounting member 15 at one end of the scale element 14 by dint of its own spring property.

As discussed above, the magnetized portion 61 of the scale element 14 can be prevented from its abrasion by taking the above construction. The disorder of the magnetized recording information due to the abrasion can be also prevented.

Figure 26:
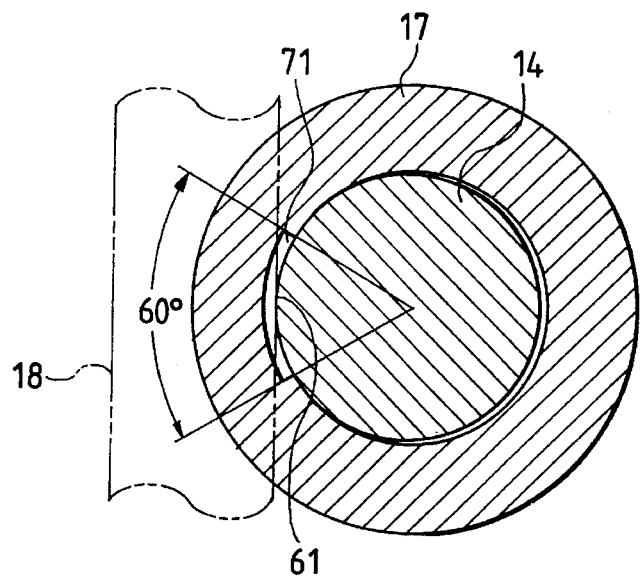
FIG. 26 is a view showing a modified example of the part B of the slider portion depicted in FIG. 20.
Figure 27:
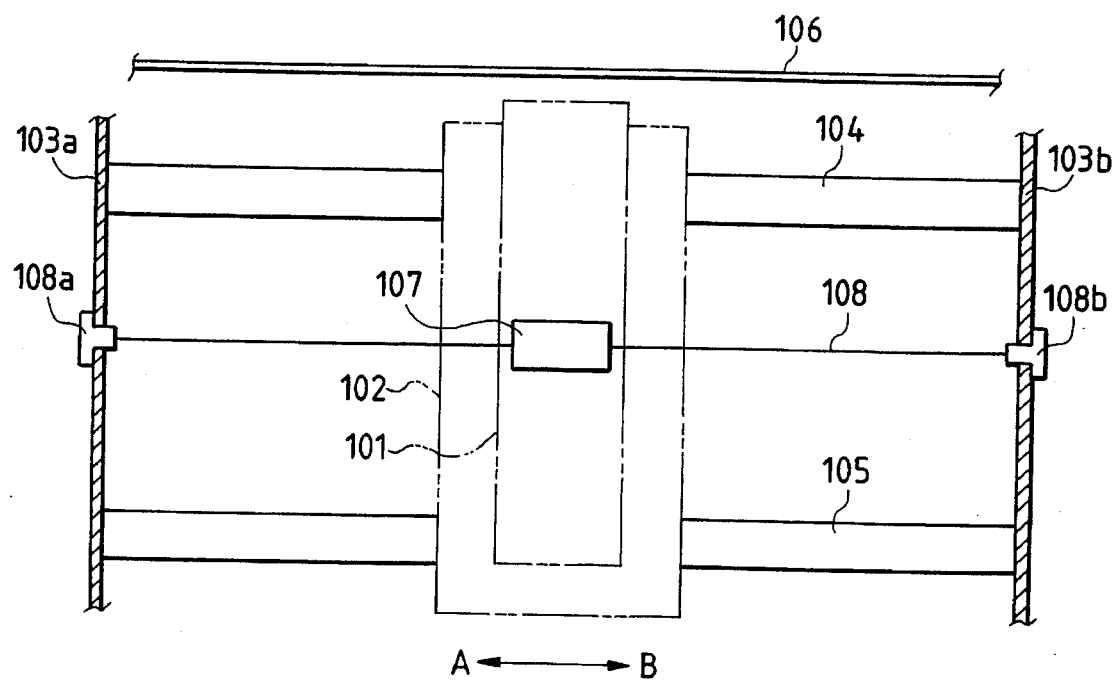
FIG. 27 is a view showing a state of being fitted to side plates of a recording apparatus incorporating a conventional magnetic linear encoder.
Figure 28:
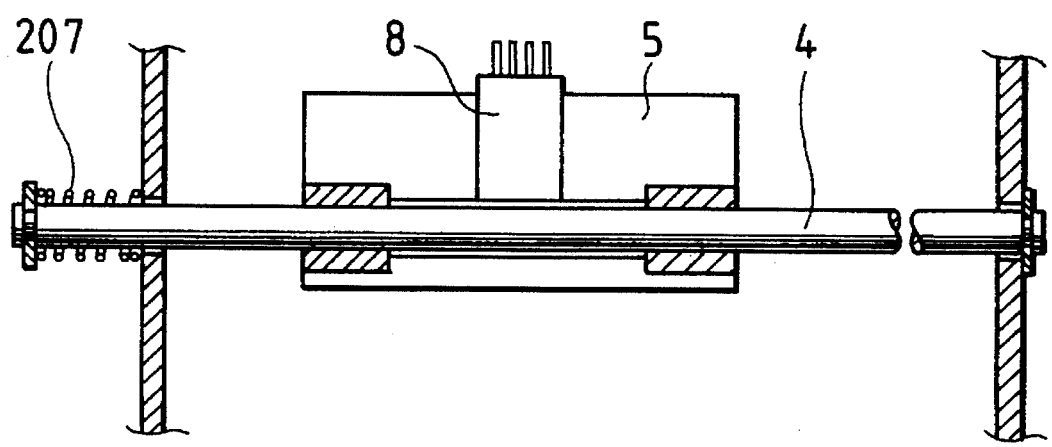
FIG. 28 is a view showing a state where the scale of the conventional magnetic linear encoder illustrated in FIG. 27 is fitted to the side plates of the apparatus.
Figure 29:
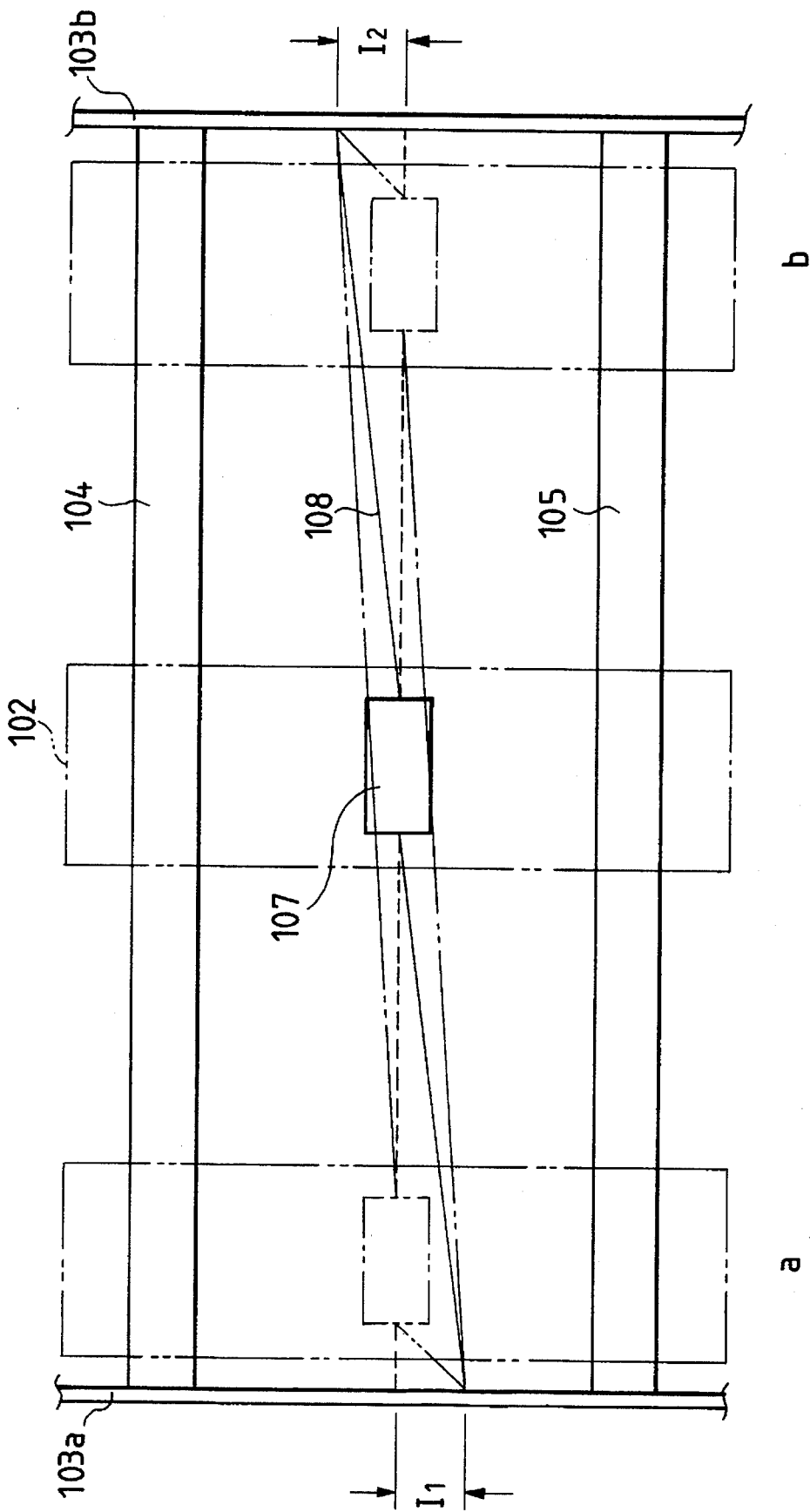
FIG. 29 is a view showing a state where the scale of the conventional magnetic linear encoder illustrated in FIG. 27 is fitted to the side plates of the apparatus in non-parallel to a guide shaft.
Figure 30:
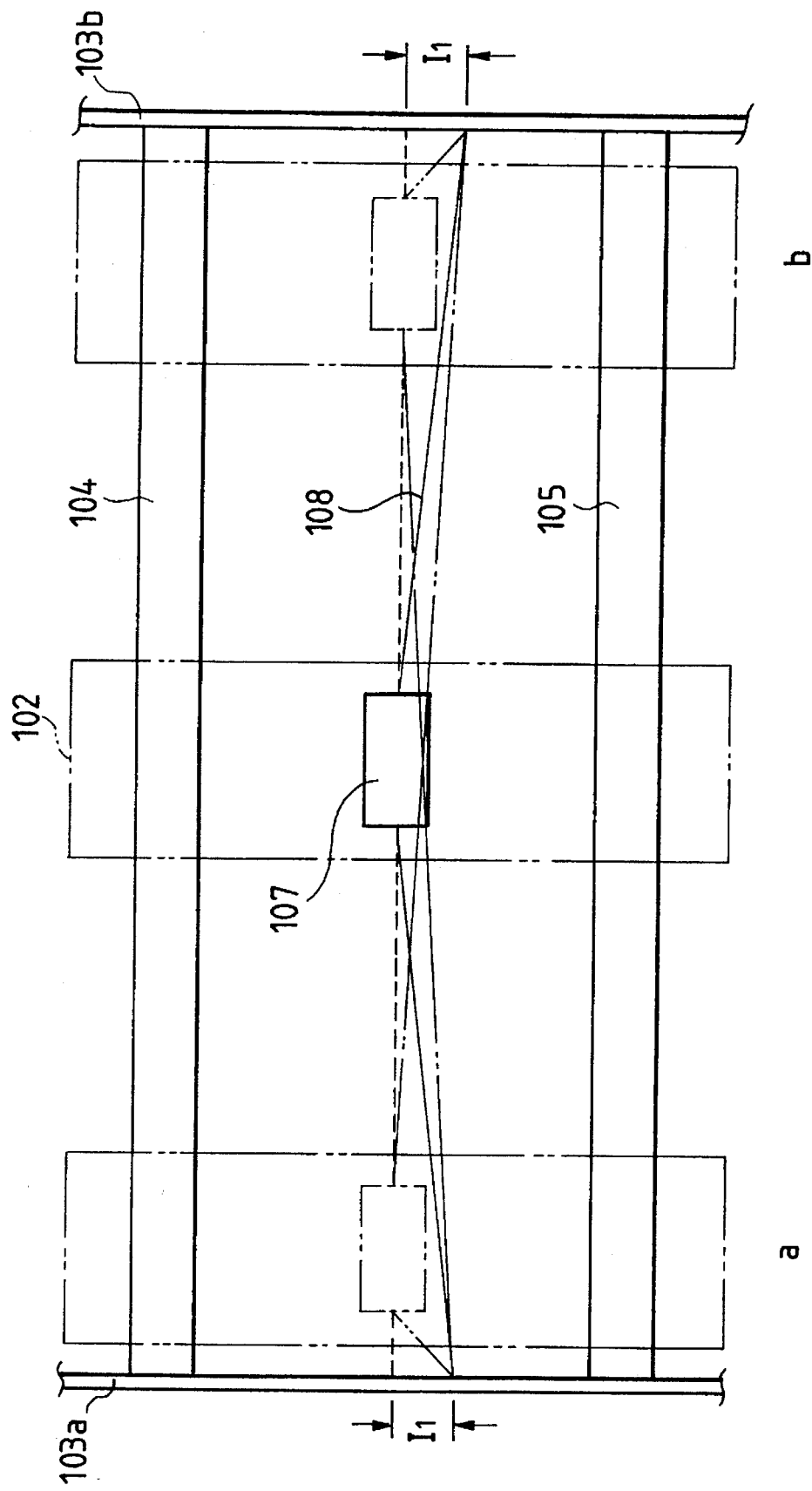
FIG. 30 is a view showing a state where there deviate mounting positions of a head and of the scale of the conventional magnetic linear encoder illustrated in FIG. 27 to the side plates of the apparatus.
Figure 31:
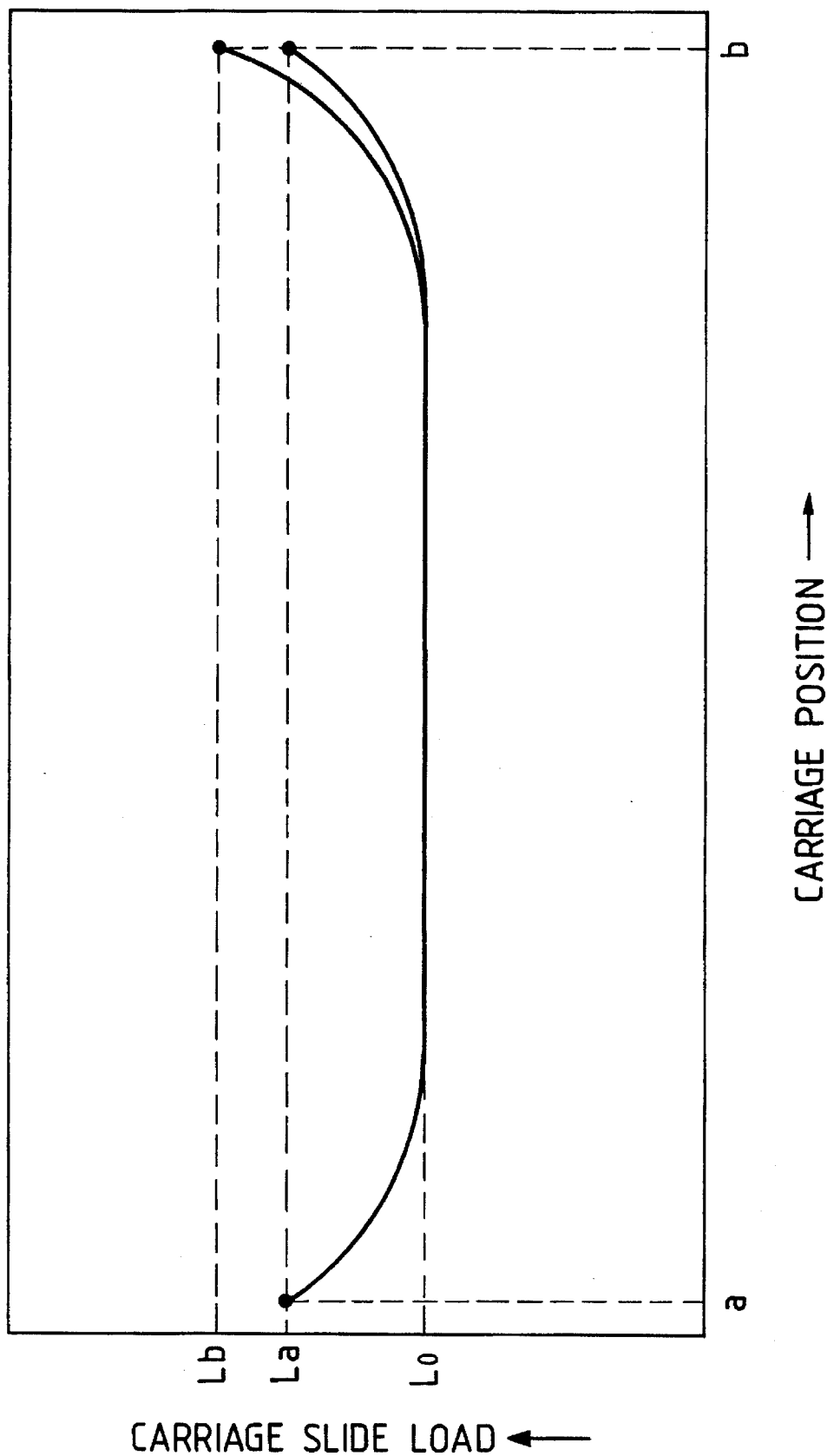
FIG. 31 is a view showing a sliding load characteristic of the carriage of the conventional recording apparatus.

Herein, FIG. 26 illustrates a modified example of the slider shown in FIG. 20. FIG. 26 is an enlarged view showing the relationship between the bearing 17 provided on the slider 16, the scale element 14 and the MR device 18. The bearing 17 is formed with a counterbore facing the magnetized portion 61 of the scale element 14.

With the formation of this counterbore 71, even though the scale element 14 shifts within the bearing 17 toward the MR device, the magnetized portion 61 is not brought into direct-contact with the bearing 17. The abrasion of the magnetized portion 61 can be therefore prevented. The disorder of the magnetized recording information due to the abrasion can be also prevented.

In accordance with the sixth embodiment, the scale element 14 is installed off the center of the bearing 17, thereby preventing the abrasion of the magnetized portion 61. In this case, however, there arises a defect in which the sliding load between the bearing 17 and the scale element 14 increases to some extent. In the modified example, however, there is no necessity for installing the scale element with a deviation, and hence the defect inherent in the sixth embodiment can also be obviated.

Note that a non-magnetic material is coated on the surface of the scale element of the magnetic linear encoder. An abrasion resistibility of the surface of the scale element is improved. Besides, a lubricity with respect to the bearing is also improved. It is therefore possible to obtain the same effects as those in the embodiments 1 and 2.

As obvious from the discussion given above, according to the sixth embodiment of the present invention, the recording apparatus employs the magnetic linear encoder constructed of the scale element and the magnetic head. The scale element consists of the magnetic material undergoing the infinitesimal pitch magnetization. The magnetic head is movable along the scale element and consists of the ferromagnetic substance magneto-resistance effect device. In this recording apparatus, there is obtained the improved recording apparatus capable of causing no disorder of the magnetized recording information by restraining the abrasion of the portion, facing to the MR device, of the scale element, i.e., the magnetized portion.

It is apparent that, in this invention, a wide range of different working modes can be formed based on the invention without deviating from the spirit and scope of the invention. This invention is not restricted by its specific working modes except being limited by the appended claims.

What is claimed is:

1. A recording apparatus having a magnetic linear encoder, comprising:

a carriage mounted with a recording head movable in recording scan directions;

a magnetized scale;

a detection unit, including a magnetic linear encoder and a bearing member, for detecting magnetized information magnetized to said scale, said scale being inserted in said bearing member so that said detection unit is movable along said scale, said detection unit including said magnetic linear encoder in combination with said scale; and connection means for snap-locking said detection unit, in which said scale is received in said bearing member, to said carriage, said connection means including clicks formed on one of said detection unit and said carriage, and click engaging portions formed on the other one of said detection unit and said carriage, said click engaging portions engaging with said clicks with the result that said detection unit is fixed to said carriage.

2. The recording apparatus according to claim 1, further comprising at least one protrusion provided on either one of said detection unit and said carriage in a direction perpendicular to the scan direction of said carriage and a fitting portion formed in the other one of said detection unit and said carriage, wherein said protrusion is fitted in said fitting portion, thereby determining a position of said carriage in the scan direction with respect to said detection unit.

3. The recording apparatus according to claim 1, wherein said detection unit is shiftable with respect to said scale only in a predetermined direction different from the scan direction.

4. The recording apparatus according to claim 3, wherein said bearing member is formed in opposite edges of said detection unit and includes elongated holes through which said scale passes.

5. The recording apparatus according to claim 3, wherein said detection unit consists of an MR device and a holding portion for holding said MR device, and said holding portion is made of a resin of slide grade.

6. A recording apparatus having a magnetic linear encoder, comprising:

an apparatus body;

a guide shaft provided between first and second side plates of said apparatus body;

a carriage mounted with a recording head and movable along said guide shaft in recording scan directions;

a magnetized scale;

a detection unit, including a magnetic linear encoder, for detecting magnetized information magnetized to said scale, said scale being inserted in said detection unit so that said detection unit is movable along said scale, detection unit being provided on said carriage and including said magnetic linear encoder in combination with said scale;

a first support member provided at one end of said scale and movably disposed on said first side plate of said apparatus body, said first support member performing self-alignment of said scale by scanning movement of said carriage to said first side plate of said apparatus body; and a second support member provided on the other end of said scale and movably disposed on the second side plate of said apparatus body, said second support member performing self-alignment of said scale by scanning movement of said carriage to said second side plate of said apparatus body.

7. The recording apparatus according to claim 6, wherein said first and second support members include roll bearings between said side plates and said support members.

8. The recording apparatus according to claim 6, wherein said first and second support members include slide bearings between said side plates and said support members.

9. A recording apparatus having a magnetic linear encoder, comprising:

an apparatus body having side plates;

a guide shaft provided between said side plates of said apparatus body;

a carriage mounted with a recording head and movable along said guide shaft in recording scan directions;

a magnetized scale;

a magnetic head for detecting magnetized information magnetized to said scale, said magnetic head including said magnetic linear encoder in combination with said scale; and a support member for supporting said magnetic head, said scale being inserted in said support member so that said support member is movable along said scale, said support member being movably disposed with respect to said carriage, said support member moving for recording scan and performing self-alignment of said scale by performing recording scanning movement.

10. The recording apparatus according to claim 9, wherein said support member includes a roll bearing between said carriage and said support member.

11. A recording apparatus having a magnetic linear encoder, comprising:

an apparatus body including side plates;

a guide shaft provided between said side plates of said apparatus body;

a carriage mounted with a recording head and movable along said guide shaft in recording scan directions;

a magnetized scale;

a magnetic head, including a magnetic linear encoder, for detecting magnetized information magnetized to said scale, said magnetic head including said magnetic linear encoder in combination with said scale;

a support member for supporting said magnetic head, said scale being inserted in said support member so that said support member is movable along said scale, said support member being provided on said carriage means for positioning said scale to said side plates of said apparatus body; and means for restraining an abrasion of said scale with respect to said magnetic head.

12. The recording apparatus according to claim 11, wherein said abrasion restraining means is constructed together with said positioning means so that said scale is set off the center of a bearing for guiding said scale in a direction opposite to said magnetic head.

13. The recording apparatus according to claim 11, wherein said abrasion restraining means includes a counterbore in said bearing for guiding said scale on the side of said magnetic head.

14. The recording apparatus according to claim 11, wherein said abrasion restraining means is non-magnetic plating coated on the surface of said scale.

15. The recording apparatus according to claim 11, wherein said positioning means is constructed so that one end of said scale is fixed but the other end is a free end.

16. The recording apparatus according to claim 11, wherein said positioning means includes biasing means for shifting said scale toward said guide shaft.

17. The recording apparatus according to claim 11, wherein said positioning means includes regulating means for regulating a positional relationship between said scale and said guide shaft.

* * * * *

UNITED STATES PATENT AND TRADEMARK OFFICE
CERTIFICATE OF CORRECTION

PATENT NO. : 5,588,757
DATED : December 31, 1996
INVENTOR(S) : Unosowa et al.

It is certified that error appears in the above-indentified patent and that said Letters Patent is hereby corrected as shown below:

COLUMN 4:

Line 46, "line 11-11," should read --line II-II,--.

COLUMN 11:

Line 64, "to" should be deleted.
Line 65, "fix" should read --to fix--.

Signed and Sealed this

Fifteenth Day of July, 1997

Attest:

BRUCE LEHMAN

Attesting Officer

Commissioner of Patents and Trademarks